US012585228B2

(12) United States Patent
Herbsommer et al.

(10) Patent No.: US 12,585,228 B2
(45) Date of Patent: Mar. 24, 2026

(54) VAPOR CELL FOR QUANTUM-BASED DEVICE

(71) Applicant: Texas Instruments Incorporated, Dallas, TX (US)

(72) Inventors: Juan Herbsommer, Allen, TX (US); Baher Haroun, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 253 days.

(21) Appl. No.: 18/203,741

(22) Filed: May 31, 2023

(65) Prior Publication Data

US 2024/0402654 A1 Dec. 5, 2024

(51) Int. Cl.
*G04F 5/14* (2006.01)

(52) U.S. Cl.
CPC .................................... *G04F 5/14* (2013.01)

(58) Field of Classification Search
CPC ............... G04F 5/14; G04F 5/145; H03L 7/26
See application file for complete search history.

(56) References Cited

U.S. PATENT DOCUMENTS

2011/0174786 A1* 7/2011 Lefebvre .............. B23K 26/322 219/121.64
2021/0114926 A1* 4/2021 Ramirez-Serrano ......................... G01R 29/0864
2022/0107609 A1* 4/2022 Herbsommer .......... G04F 5/145
2023/0143437 A1* 5/2023 Lutwak ..................... G04F 5/14 331/94.1

FOREIGN PATENT DOCUMENTS

WO WO-2022014156 A1 * 1/2022 ............... H01S 1/06

* cited by examiner

*Primary Examiner* — Ryan Johnson
(74) *Attorney, Agent, or Firm* — Zhenhai Fu; Frank D. Cimino

(57) ABSTRACT

In one example, a method includes placing a first glass substrate and a second glass substrate in a chamber. The first glass substrate has a first surface and the second glass substrate has a second surface. The first glass substrate and the second glass substrate are brought together in the chamber to form a junction between the first and second surfaces. The junction is sealed to form a glass container that encases a dipolar gas when the chamber is filled with the dipolar gas. An EM reflective coating is formed on an outer surface of the glass container.

30 Claims, 20 Drawing Sheets

VAPOR CELL FOR QUANTUM-BASED DEVICE

BACKGROUND

A vapor cell (or a physics cell) can include a hermetically sealed container containing a gas. A vapor cell may be useful in numerous applications, including as part of a chip-scale millimeter-wave atomic clock. The gas within a vapor cell can contain dipolar molecules at a relatively low pressure that can be chosen to provide a narrow signal absorption frequency peak indicative of the quantum transition molecules as detected at an output of the cavity. An electromagnetic (EM) signal can be launched into the cavity through an aperture in the cavity that is electromagnetically translucent or substantially transparent. Closed-loop control can dynamically adjust the frequency of the signal to match the molecular quantum rotational transition. The frequency produced by quantum rotational transition of the selected dipolar molecules may vary less due to aging of the chip-scale millimeter-wave atomic clock and with temperature or other environmental factors, which makes the system useful to provide an accurate clock source that also has long-term stability. However, it may be challenging to hermetically seal a container to maintain the gas pressure in the container, and to mass produce such containers.

SUMMARY

In one example, a method includes placing a first glass substrate and a second glass substrate in a chamber. The first glass substrate has a first surface and the second glass substrate has a second surface. The first glass substrate and the second glass substrate are brought together in the chamber to form a junction between the first and second surfaces. The junction is sealed to form a glass container that encases a dipolar gas when the chamber is filled with the dipolar gas. An EM reflective coating is formed on an outer surface of the glass container.

In another example, an apparatus includes a container and an antenna. The container includes a first glass portion and a second glass portion sealed together and enclosing a dipolar gas within glass. The container includes an EM reflective coating on an outer surface thereof. The EM reflective coating includes an opening that allows an EM signal to propagate into or out of the container. The antenna is located at the opening.

In another example, an apparatus includes a container and an antenna. The container includes a first glass portion, a second glass portion, and a spacer between the first glass portion and the second glass portion. The spacer is sealed to the second glass portion at a junction between the spacer and the second glass portion. The first glass portion, the second glass portion, and the spacer collectively enclose a dipolar gas within glass. The container includes an EM reflective coating on an outer surface thereof. The EM reflective coating includes an opening that allows an EM signal to propagate into or out of the container. The first glass portion includes a spacer. The container has a first end and a second end. The spacer includes an electronic band gap portion that is external to the container and is between the first and second ends of the container. The antenna is located at the opening.

BRIEF DESCRIPTION OF THE DRAWINGS

The same reference numbers or other reference designators are used in the drawings to designate the same or similar (functionally and/or structurally) features. Also, the figures are not necessarily drawn to scale.

DETAILED DESCRIPTION

A gas-filled container may be fabricated by hermetically sealing two substrates together, at least one of the substrates being hollowed out to form a cavity at least partially defining the interior walls of the container. The sealed substrates can form multiple cavities, and can be singulated to form multiple containers. In some examples, the substrates can be glass substrates. The sealing can be performed when the glass substrates are in a chamber filled with a dipolar gas at a target pressure. The sealing can be performed by projecting multiple laser beams on the junctions between the glass substrates, simultaneously and/or sequentially, to perform localized heating to melt the glass substrates at the junctions. The melting of the glass substrates can create bond between the glass substrates and seal the junctions. Various techniques, such as optical techniques, can be employed to control the precision in projecting the laser beams and melting the glass substrates at the junctions. Moreover, such arrangements can avoid using other sealing materials (e.g., metal) which may otherwise react with the dipolar gas and affect the long term stability of the vapor cell. Also, semiconductor fabrication techniques, including photolithography, etching, metallization, alignment, etc., can be employed to align and singulate the glass substrates, and to mass produce hermetically sealed containers with well-controlled properties.

The sealed container can hold gas molecules or atoms that can be interrogated with electromagnetic radiation in order to detect and use their quantum transitions for electronic devices applications. For example, a hermetic glass container can be filled with a relatively pure dipolar gas at low pressure for quantum transition detection of the gas molecules for electronic devices applications. The container can be configured as a vapor cell such that electromagnetic waves within a frequency range can be launched into the container to interrogate the dipolar gas molecules for quantum molecular rotational transition detection. As described above, the localized heating process can avoid introduction of other sealing material that may otherwise contaminate or degrade the chemical integrity the contained gas over time. Also, metallization and etching processes can be applied to external surfaces of the container to form features for controlled electromagnetic mode propagation, which is useful to more accurately detect the quantum transitions of the gas molecules.

Figure 1:
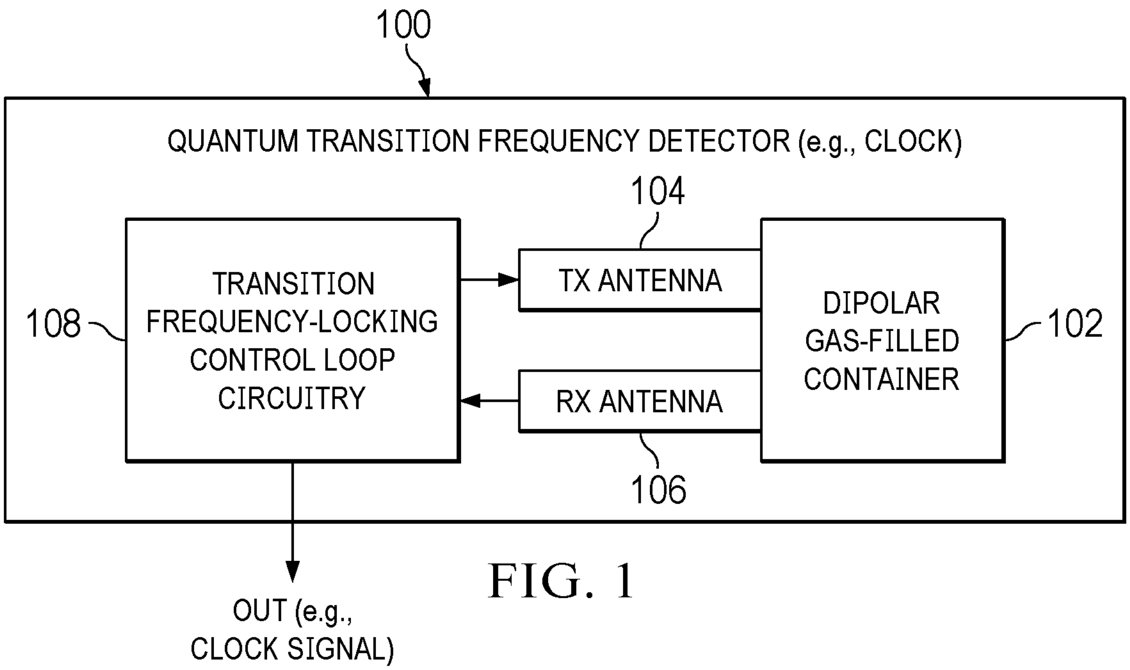
FIG. 1 is a schematic of a quantum transition frequency detector, according to some examples.

FIG. 1 is a block diagram of an example quantum transition frequency detector 100 that can be integrated to provide, for example, a clock that is accurate to within one second in several hundred years. In other examples, the frequency detector 100 is useful to create a magnetic field sensor (magnetometer), an electric field sensor, or a pressure sensor. Detector 100 includes a glass container 102, or an assembly that includes multiple such glass containers. The container 102 is hermetically sealed to contain a dipolar gas at a relatively low pressure, the precise pressure depending on which dipolar gas is used, among other factors. In some examples, the pressure is less than the atmospheric pressure at sea level. In some examples, the pressure is less than one one-hundredth of atmospheric pressure at sea level. In some examples, the pressure is less than one one-thousandth of atmospheric pressure at sea level. In some examples, the pressure is less than one ten-thousandth of atmospheric pressure at sea level. Suitable dipolar gases can include water vapor (H2O), acetonitrile (CH3CN), cyanoacetylene (HC3N), ammonia (NH3), carbonyl sulfide (OCS), hydrogen cyanide (HCN), and hydrogen sulfide (H2S). The container 102 (or each container in an assembly) can be coated on the outside with an electromagnetically reflective (e.g., electrically conductive) material (e.g., a metal), or the container 102 (or each container in an assembly) can be placed in an enclosure that is made of or coated with an electromagnetically reflective material such that exterior walls of the container adjoin (e.g., are substantially in contact with) the electromagnetically reflective material of the enclosure. As examples, the enclosure can be metal or metal-coated plastic. As examples, metallization of the container 102 or the enclosure can be done by sputtering or by evaporation. A single container, or multiple containers assembled in an enclosure, can form a vapor cell. Transmitter (TX) and receiver (RX) antennas (104, 106) are coupled to the glass container at electromagnetically translucent or substantially transparent windows or container-end access points to respectively launch into the glass container or assembly 102 and receive from the glass container or assembly 102 millimeter-wave electromagnetic radiation that courses through the container(s) 102.

Circuitry 108 coupled to the antennas (104, 106) provides a closed loop that can sweep the frequency of millimeter-wavelength electromagnetic waves (e.g., between about 20 GHz and about 400 GHz, e.g., between about 70 GHz and about 180 GHz) radiated to the dipolar gas molecules confined in the containers 102. An absorption at the particular frequency of a quantum transition of the dipolar gas molecules can be observed as a decrease in the power transmitted between transmitter and receiver, and specifically, as a dip in transmitted power at a particular frequency (or a set of frequencies) within the swept frequency range. Iteratively locking to the bottom of the dip provides the quantum transition frequency of the molecules of the confined gas, of which the transition frequency can be relatively stable with respect to the age of the hermetic container, the temperature, and other environmental factors. The stability permits detector 100 to be used for creating accurate quantum references and clocks, the accuracy of which is not substantially reduced with device age or changes in operating environment. Circuitry 108 can include, for example, a voltage-controlled oscillator (VCO) or a digital controlled oscillator (DCO) to generate millimeter waves at a particular frequency that is adjusted until the frequency matches the reference peak absorption frequency (the frequency location of the transmitted power dip).

Linear dipolar molecules have rotational quantum absorption at regular frequencies. As an example, OCS exhibits a transition approximately every 12.16 GHz. A vapor cell as described herein thus can make use of any of the many available quantum transitions in the millimeter-wave frequency range. Circuitry 108 can further include, for example, a divider to divide down the matched frequency, which can be in the tens or hundreds of gigahertz, to a lower output clock frequency, e.g., about 100 MHz. The use of millimeter waves can eliminate (or reduce) the need for a laser as a quantum transition interrogation mechanism, reducing cost and complexity of detector 100 over devices requiring lasers. Operation within the aforementioned frequency ranges permits the transmitter and receiver antennas (104, 106) to be of lengths less than, for example, 10 millimeters, 5 millimeters, or 1 millimeter, depending on the quantum transition frequency of the dipolar gas selected. The container 102 (or each container used in an assembly of containers) can each measure between, for example, about 1 centimeter and about 20 centimeters in length, or about 2 centimeters and about 10 centimeters in length. The container 102 (or each container used in an assembly of containers) can each measure less than about 1 centimeter in dimensions of width and height. In a case where the container 102 is shaped as a circular, elliptical, or rectangular cross-section tube, it can also have a diameter of less than about 1 centimeter. Because quantum absorption increases with container length, with longer container lengths providing for a better-defined observed quantum transition, the length of the container 102 can be limited by fabrication limitations and system package size limitations. Meandering or serpentine-shaped vapor cells can provide longer effective container length within a more compact system package size either by using a bent (e.g., U-shaped) container or by coupling together multiple containers.

Figure 2A:
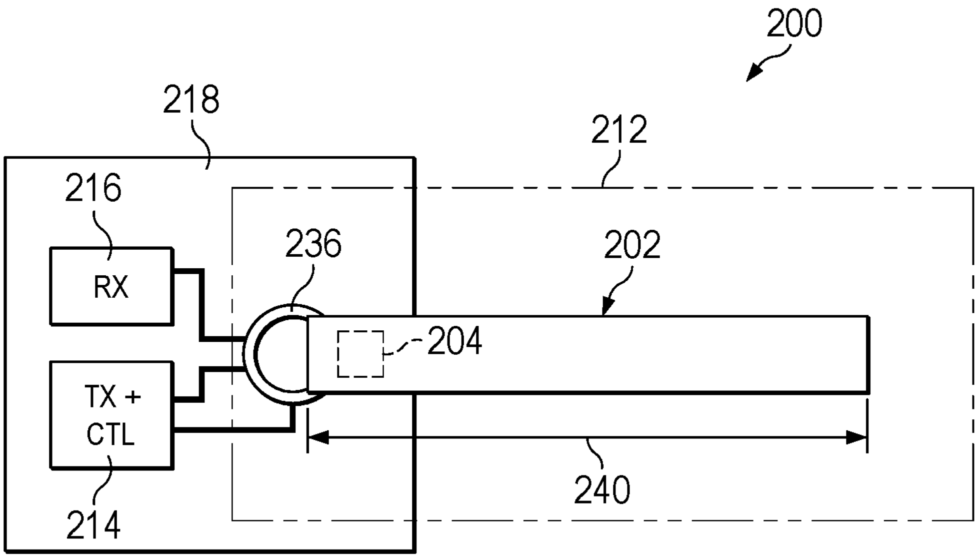
FIG. 2A is a schematic illustrating a top-down view of an example quantum transition frequency detector system, according to some examples.

FIG. 2A shows a system-level top-down view of an example quantum transition frequency detector system 200 (e.g., configured as a clock) that incorporates a dipolar gas confining container 202. Other example quantum transition frequency detector systems may include a waveguide coupling two or more separate containers.

The fabrication of container 202 may involve hermetically sealing two or more substrates (250, 260 in FIG. 2B) together while they are immersed within a dipolar gas, with at least one of the substrates being hollowed out to form a cavity that at least partially defines the interior walls of container 202. In some examples, the substrates used to form container 202 may satisfy one or more of the following requirements: (1) they are not reflective to a laser beam; (2) they have a dielectric constant lower than 5; (3) they have a loss tangent at millimeter-wave frequencies lower than 0.025; and (4) they are not chemically reactive with the dipolar gas being enclosed. Certain material, such as glass, may satisfy all four requirements. In some examples, container 202 may have interior surfaces consisting entirely of glass material, such that the dipolar gas enclosed within container 202 is in contact only with glass. Example glass that can be used to form container 202 includes Borofloat33®, AF32®, and D263® (all manufactured by Schott AG), some of which can include Borosilicate.

Figure 2B:
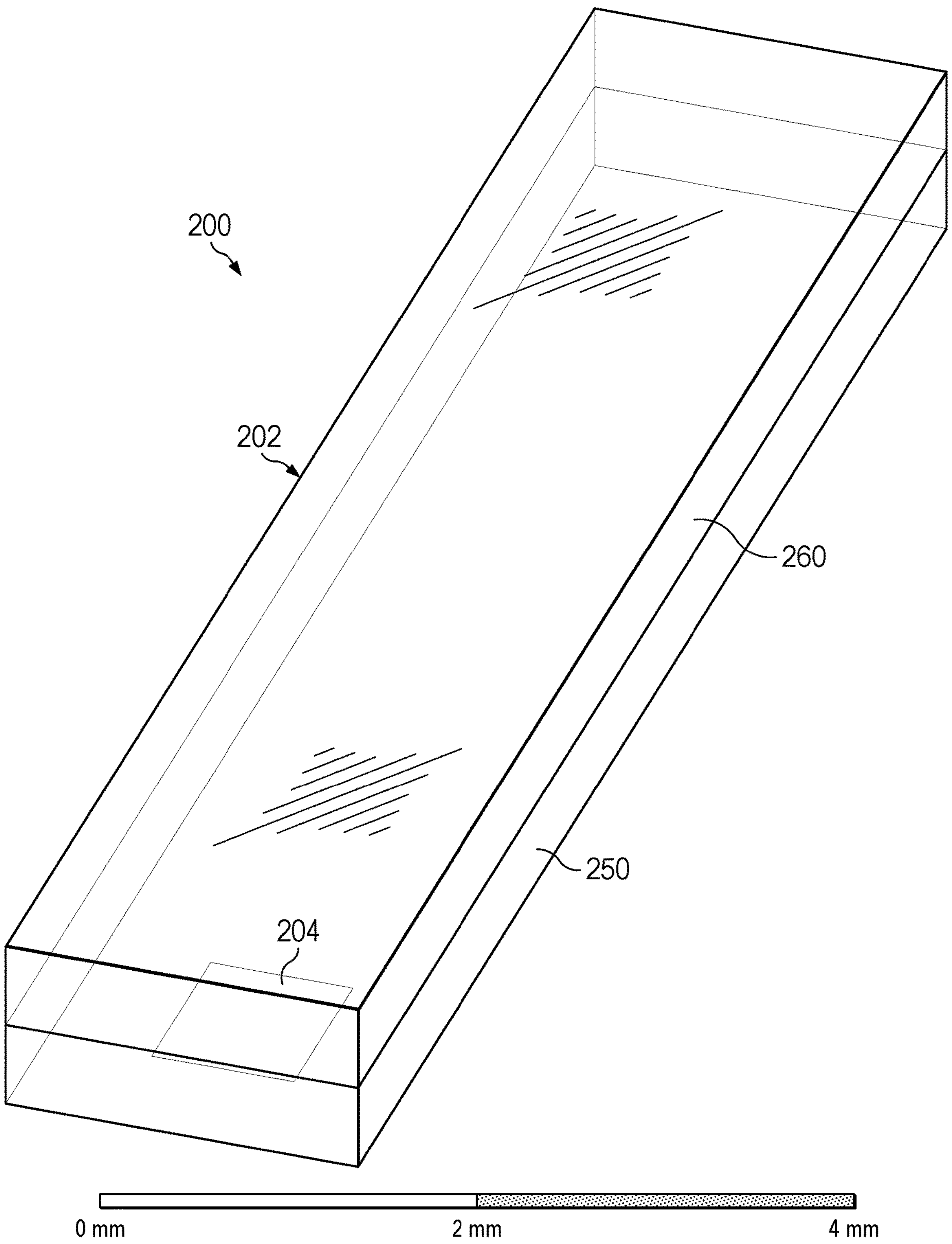
FIG. 2B is a schematic illustrating an oblique parallel projection view of the example quantum transition frequency detector system of FIG. 2A, according to some examples.

Container 202 can have any suitable shape. In the examples of FIG. 2A and FIG. 2B, container 202 has a substantially linear shape extending from a first end of container 202 to a second end of container 202 along a single axis. In addition, container 202 has a rectangular cross-section. Container 202 is configured with a single rectangular launch/receipt window 204 at the locations of a millimeter wave antenna for under-side signal launch and receipt. Container 202 can, for example, be exteriorly coated with a metal (e.g., a reactive metal such as Copper (Cu), Aluminum (Al), Chromium (Cr), or Titanium (Ti)), either omitting the coating from the window region or subsequently etching away the coating from the window region to form the window 204, and then encapsulated in enclosure 212, which can be, e.g., injection-molded plastic. In other examples, the enclosure 212 is made of or interiorly coated with a metal (e.g., a reactive metal such as Cu, Al, Cr, or Ti) and the container 202 can be placed inside the enclosure 212 such that at least portions of the exterior of the walls of the container adjoin (e.g., are substantially in contact with) the metal of the enclosure interior, so that the metal of the interior of enclosure 212 acts as a waveguide for electromagnetic waves propagating through the container 202.

During operation of system 200, electromagnetic signals are launched into the container 202 through the single launch/receipt window, propagate to the far end of the container 202, and reflect back to the single launch/receipt window 204. The container 202 can, for example, be fabricated to have a propagation length 240 of is $N \times \lambda/2$ where N is an integer multiple and $\lambda$ is the quantum transition wavelength of the dipolar gas to be expected to be observed.

Container 202 is coupled to board-mounted processing circuitry 214 and 216 at only a single end of the container 202. The electromagnetically translucent or substantially transparent rectangular single launch window 204 of container 202 is placed adjacent to a transmitter/receiver antenna (not shown), which is electrically coupled to both transmitter and control circuitry 214 and to receiver circuitry 216. Transmitter and receiver circuitry 214 and 216 can be fabricated on respective individual integrated circuit (IC) semiconductor chips or as a single transceiver/control chip (not shown). Circuitry 214 and 216 can be mounted on and electrically coupled to an electronics board 218. The board 218 can, for example, measure about 5 mm by 5 mm in length and width. The board 218 can further include wiring or other metallic interconnects to electrically couple the circuitry 214 and 216 to the window 204. A circulator structure 236 may be configured to allow separation of the transmitted signal from the received signal with the correct ratio of attenuation. Circuitry 214 and 216 may include processing electronics configured to distinguish transmitted and received electromagnetic signals.

FIG. 2B is an oblique parallel projection view of the container 202 incorporated into the example quantum transition frequency detector system 200 of FIG. 2A. Container 202 contains a dipolar gas at low pressure. Container 202 may be configured such that its interior walls in contact with the dipolar gas consist entirely of glass, such that the enclosed dipolar gas is exposed to internal glass surfaces only. An exterior of container 202 may be at least partially coated with an electromagnetically reflective material (e.g., a metal) to form a waveguide. In examples of containers having windows (e.g., window 204) for the launch and receipt of the electromagnetic waves used for interrogation of the contained gas, the conductive coating can cover the glass except for one or more portions, e.g., rectangles each of certain dimensions, placed with certain spacing from the edges of the container 202. Transmit and receive antennas can, in examples of containers having windows, be placed above, below, or to the side of the container, next to respective windows, or to a single window (e.g., window 204). The example container 202 shown in FIG. 2B may exhibit a mono-mode of electromagnetic propagation. In the illustrated example, container 202 has a rectangular cross-section and only a single window 204 through which electromagnetic signals are both launched and received. In other examples, however, the container can have cross-sections of other shapes, and/or can have windows near both ends of the container, as opposed to just one.

Figure 3A:
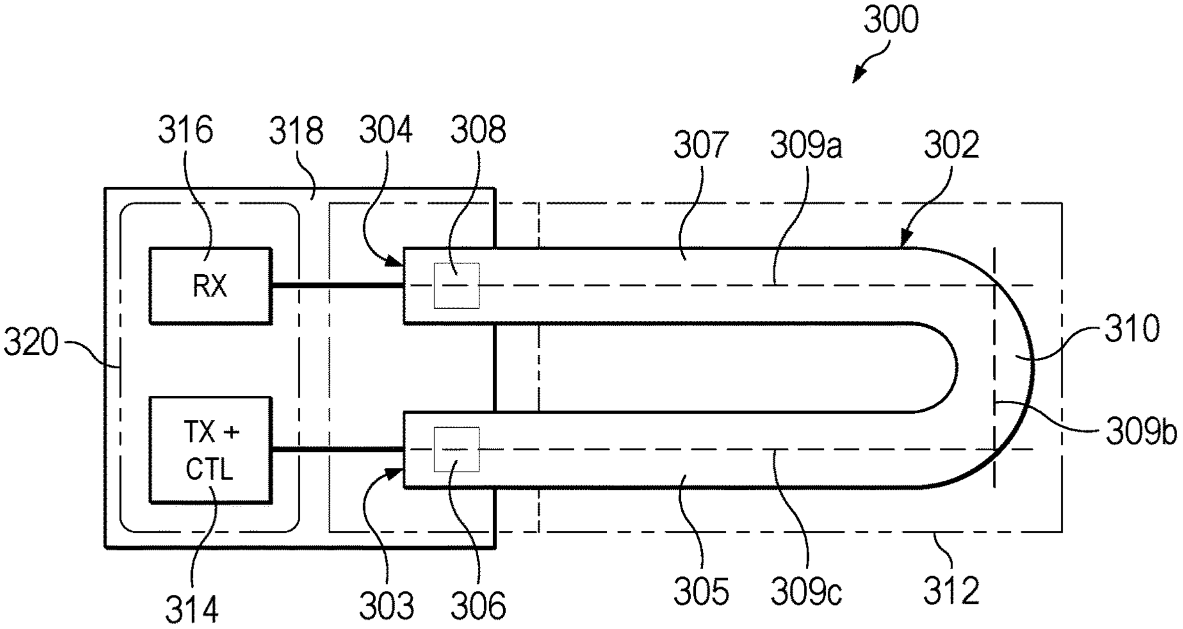
FIG. 3A is a schematic illustrating a system-level top-down view of an example quantum transition frequency detector system, according to some examples.

FIG. 3A shows a system-level top-down view of an example quantum transition frequency detector system 300 (e.g., configured as a clock) that includes a container 302 having a non-linear shape. The non-linear shape may extend from a first end 303 of container 302 to second end 304 of container 302 along a plurality of axes (309*a*, 309*b*, 309*c*). In this example, container 302 has a non-linear U-shape in which two parallel legs 305 and 307 (disposed along axis 309*c* and 309*a*, respectively) are interconnected by a channel 310 (disposed along axis 309*b*).

The fabrication of container 302 may involve hermetically sealing two or more substrates (350, 360 in FIG. 3C) together while they are immersed within a dipolar gas, with at least one of the substrates being hollowed out to form a cavity that at least partially defines the interior walls of container 302. In some examples, the substrates used to form container 302 may satisfy one or more of the following requirements: (1) they are not reflective to a laser beam; (2) they have a dielectric constant lower than 5; (3) they have a loss tangent at millimeter-wave frequencies lower than 0.025; and (4) they are not chemically reactive with the dipolar gas being enclosed. Certain material, such as glass, may satisfy all four requirements. In some examples, container 302 may have interior surfaces consisting entirely of glass material, such that the dipolar gas enclosed within container 302 is in contact only with glass. Example glass that can be used to form container 302 includes Borofloat33®, AF32®, and D263® (all manufactured by Schott AG), some of which may include Borosilicate.

Container 302 may be configured as a waveguide and may include respective rectangular windows 306 and 308 at locations proximate to wave antennas (not shown) for signal launch and receipt. An exterior of container 302 may be at least partially coated with an electromagnetically reflective material (e.g., a metal) to form a waveguide. In the illustrated example, container 302 has two windows 306 and 308 through which electromagnetic signals are launched or received. In other examples, container 302 can have one or more windows positioned at locations different from what is shown. In examples of containers having windows (e.g., windows 306 and 308) for the launch or receipt of the electromagnetic waves used for interrogation of the contained gas, the conductive coating can cover the glass of container 302 except for one or more portions, e.g., rectangles each of certain dimensions, placed with certain spacing from respective ends of container 302. Transmit and receive antennas can, in examples of containers having windows, be placed above, below, or to the side of the container, next to respective windows 306 and 308. Container 302 may exhibit a mono-mode of electromagnetic propagation.

Container 302 is coupled to board-mounted processing circuitry 314, 316 at respective opposite ends 303 and 304 of the container 302. The electromagnetically translucent or substantially transparent rectangular launch windows 306 and 308 are placed adjacent to a transmitter antenna and receiver antenna, respectively, which are electrically coupled to transmitter and control circuitry 314 and to receiver circuitry 316, respectively. Transmitter and receiver circuitry 314 and 316 can be fabricated on respective individual IC semiconductor chips or as a single transceiver/control chip (not shown). Circuitry 314 and 316 can be mounted on and electrically coupled to an electronics board 318. The board 318 can, for example, measure about 5 mm by 5 mm in length and width. The board 318 can further include wiring or other metallic interconnects to electrically couple the circuitry 314 and 316 to windows 306 and 308, respectively. Circuitry 314 and 316 may include processing electronics configured to distinguish transmitted and received electromagnetic signals.

Figure 3B:
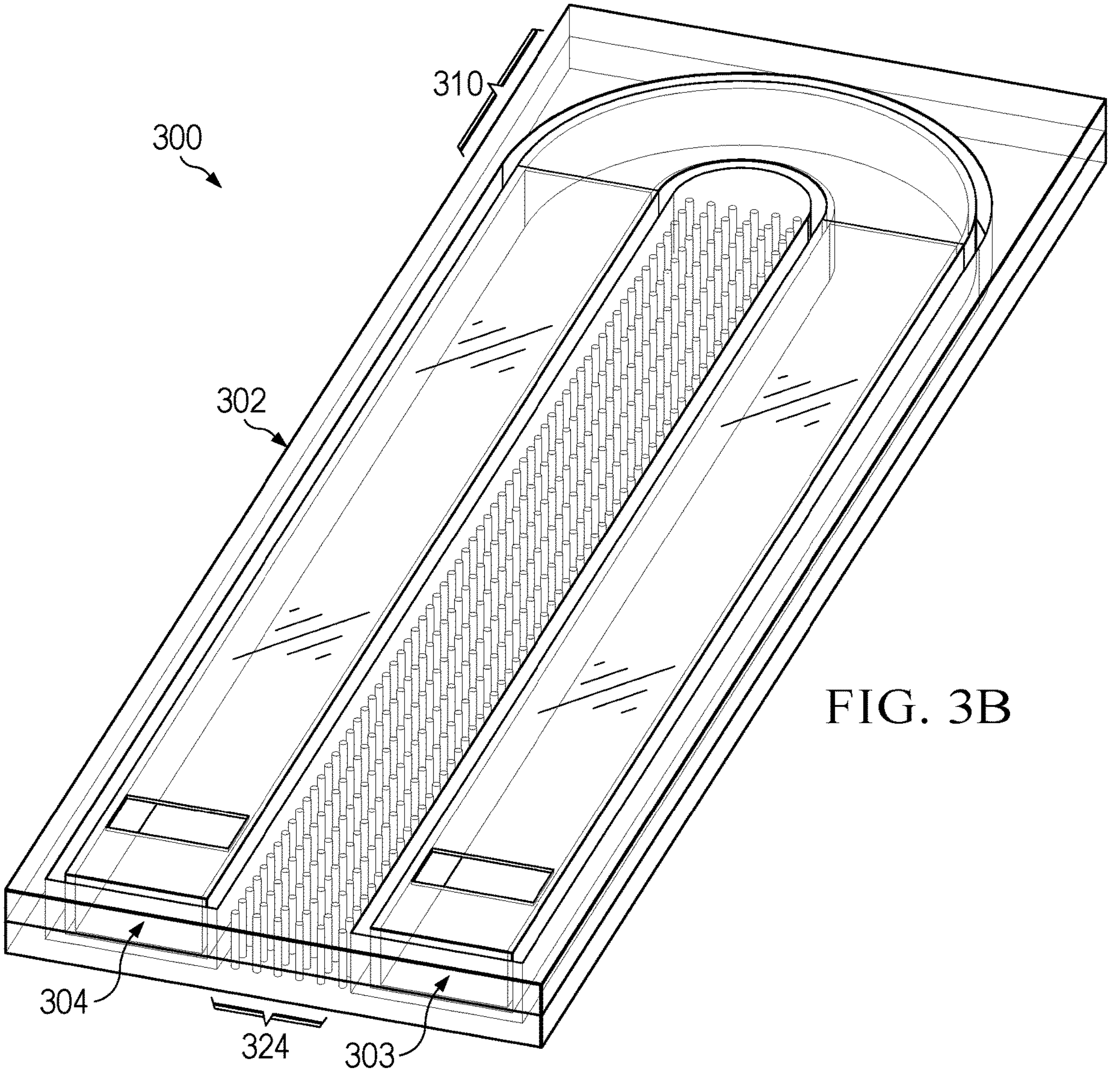
FIG. 3B is an oblique parallel projection view of the container incorporated into the example quantum transition frequency detector system of FIG. 3A, according to some examples.
Figure 3C:
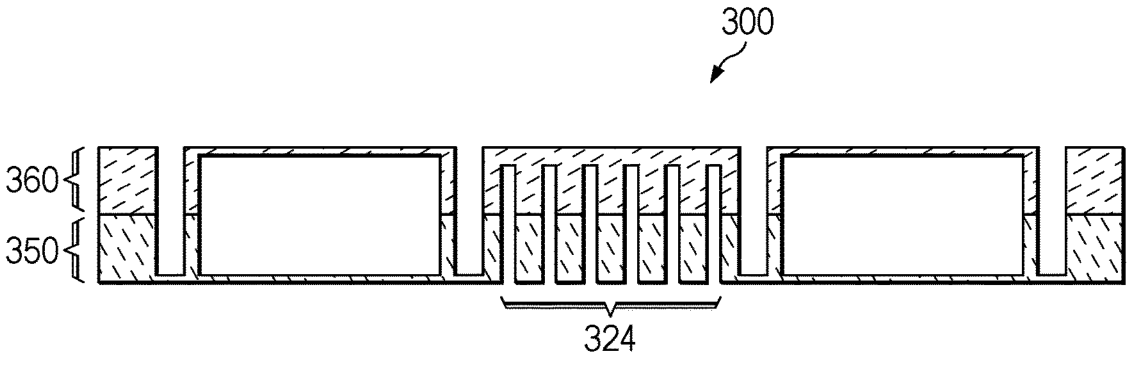
FIG. 3C provides a cross-sectional view of the container of FIG. 3B, according to some examples.

FIG. 3B is an oblique parallel projection view of the container 302 incorporated into the example quantum transition frequency detector system 300 of FIG. 3A. FIG. 3C provides a cross-sectional view of the container 302 of FIG. 3B. Container 302 contains a dipolar gas at low pressure. Container 302 may be configured such that its interior walls in contact with the dipolar gas consist entirely of glass, such that the enclosed dipolar gas is exposed to internal glass surfaces only. Container 302 is shown in FIGS. 3B and 3C as having a rectangular cross-section, but any suitable cross-sectional shape may be used.

In this example, region 324 includes an array of electronic bandgap (EBG) features located between a first end 303 and a second end 304 of container 302. As shown more clearly in the cross-sectional view of FIG. 3C, the EBG features in this example include an array of voids extending fully through substrate 350 and at least partially through substrate 360. Substrates 350 and 360 are joined together to form a hermetically-sealed cavity therebetween. The cavity defines the sealed interior of container 302, within which the dipolar gas is enclosed.

The EBG voids within region 324 may be formed, for examples, using laser induced deep etching (LIDE). Although referred to herein as voids, each void, once formed, may be at least partially filled, or otherwise have its interior coated, with one or more layers of material. The material may be selected, for example, to improve an EMF rejection achieved by the EBG features within region 324. Each void may be cylindrical in shape and may have approximately a 50 micrometer diameter, but any suitable shape and width may be used. The voids may be spaced apart from each other at a distance of $\lambda/4$, where $\lambda$ is the quantum transition wavelength of the dipolar gas to be expected to be observed. As explained further with reference to FIGS. 8A and 8B, the voids may be arranged to have the effect of reducing lateral leakage of an electromagnetic field (EMF) across region 324 (and hence not internal to container 302). In certain examples, spacing apart the voids at a distance of $\lambda/4$ may maximize the destructive interference of EMF propagation across region 324.

In some alternative examples, parallel trenches may be used in place of voids, such that a single trench connects the dots so to speak for a single line of the voids shown in FIGS. 3B and 3C. While the use of parallel trenches, as opposed to voids, may more significantly reduce lateral EMF leakage, the use of parallel trenches may also compromise the structural integrity of region 324.

FIGS. 4A through 4M are schematics that illustrate an example method of forming vapor cells. FIGS. 4A through 4M illustrate respective views of three substrates 402, 404, and 406 that are to be processed and sealed together to form an array of gas-filled containers 401 as vapor cells. In some examples, each container 401 may operate as a vapor cell that encloses a dipolar gas. Certain physical cells described herein enclose the dipolar gas entirely within glass, such that the gas is in contact with glass only.

Figure 4A:
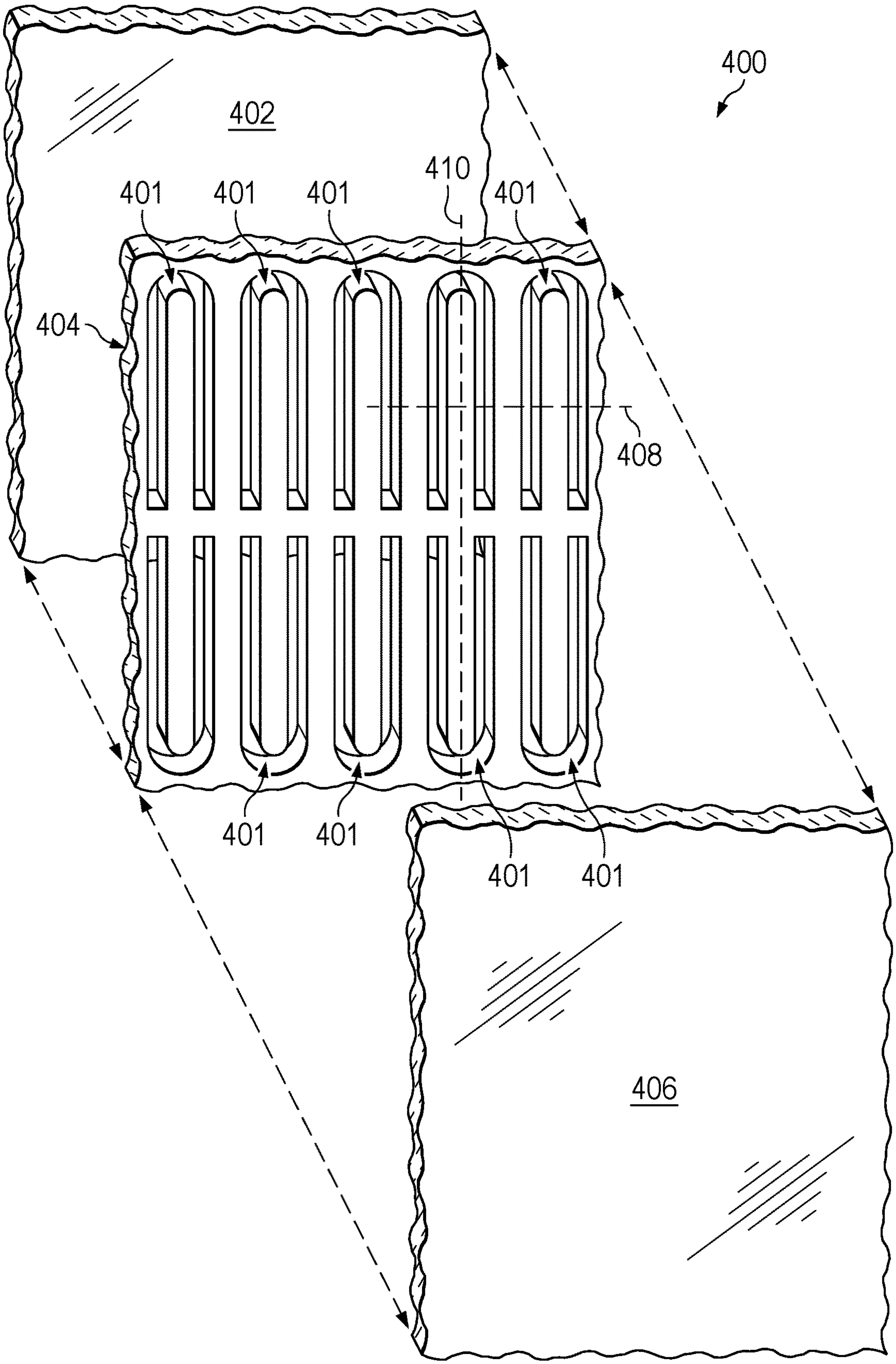
FIGS. 4A, 4B, 4C, 4D, 4E, 4F, 4G, 4H, 4I, 4J, 4K, 4L, and 4M are schematics showing a method of forming vapor cells, according to some examples.

FIG. 4A provides top-views of respective portions of three substrates 402, 404, and 406 that are configured to be sealed together to collectively form an array of gas-filled containers 401. The fabrication of containers 401 may involve hermetically sealing three or more substrates (402, 404, and 406) together while they are immersed within a dipolar gas, with at least one of the substrates being hollowed out to form a cavity that at least partially defines the interior walls of containers 401.

In some examples, the substrates (402, 404, 406) used in forming the array of containers 401 may satisfy one or more of the following requirements: (1) they are not reflective to a laser beam; (2) they have a dielectric constant lower than 5; (3) they have a loss tangent at millimeter-wave frequencies lower than 0.025; and (4) they are not chemically reactive with the dipolar gas being enclosed. Certain material, such as glass, may satisfy all four qualifications. Example glass that can be used to form container 402 includes Borofloat33®, AF32®, and D263® (all manufactured by Schott AG), some of which can include Borosilicate.

As shown in FIG. 4A, each container 401 may have a non-linear shape (e.g., a U-shape), but containers 401 may have any suitable shape. When joined together, substrate 404 can provide spacers that space apart and are interposed between substrates 402 and 406, such that substrate 404 couples substrate 402 to substrate 404. The joining of substrates 402-406 together may involve joining substrate 404 to one of either substrate 402 or 406 and, sometime thereafter, joining substrate 404 to the other one of either substrates 402 or 406, to form interior sidewalls for each container 401.

To enclose a dipolar gas within each chamber 401, the substrates 402, 404, and 406 may all be placed and aligned in a chamber filled with the gas, with substrate 404 already joined to either spacer 402 or 406. The two joined substrates (either 402 and 404, or 404 and 406) are then brought together with the third substrate (either 402 or 406) to form a junction between an outer surface of substrate 404 and an opposing surface of the third substrate (either 402 or 406). The junction is sealed to form containers 401, with each container enclosing dipolar gas therein.

The interior of containers 401 may be formed from material that does not chemically react with the enclosed dipolar gas. For example, the joining of substrates 402-406 together may result in each container 401 having interior surfaces that consist entirely of glass or some other material not chemically reactive with the enclosed dipolar gas.

Containers 401 may be configured such that the enclosed dipolar gas is not exposed to any metallic material. Because certain dipolar gas may chemically react with certain metals over time, thereby altering the nature and properties of the gas, the lack of any metallization within the interior of containers 401 may result in an improvement in device performance and reliability. In addition, the lack any internal metallization within containers 401 may reduce their fabrication costs, particularly in comparison to other vapor cells that apply precious metals, such as gold (Au), for internal metallization.

In some examples, an EM reflective coating may be formed one or more outer surfaces of each container 401. To form waveguides, for example, metallization may be applied to an outer surface of containers 401 during their fabrication, as described further herein with reference to FIGS. 4D-4M.

Figure 4B:
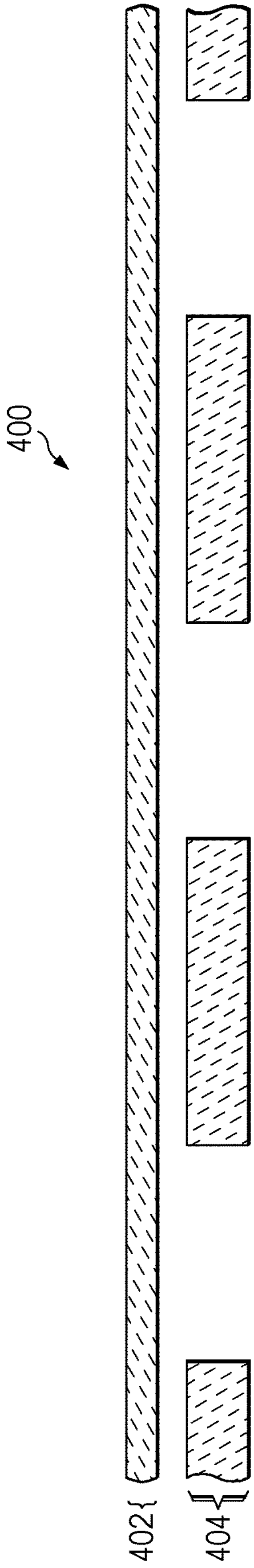

FIG. 4B provides cross-sectional views of respective portions of substrates 402 and 404, where the cross section is aligned with the axis 408 shown in FIG. 4A. The joining of substrate 402 to substrate 404 may involve aligning those substrates and bringing those substrates together, such that opposing surfaces come in contact with one another.

Figure 4C:
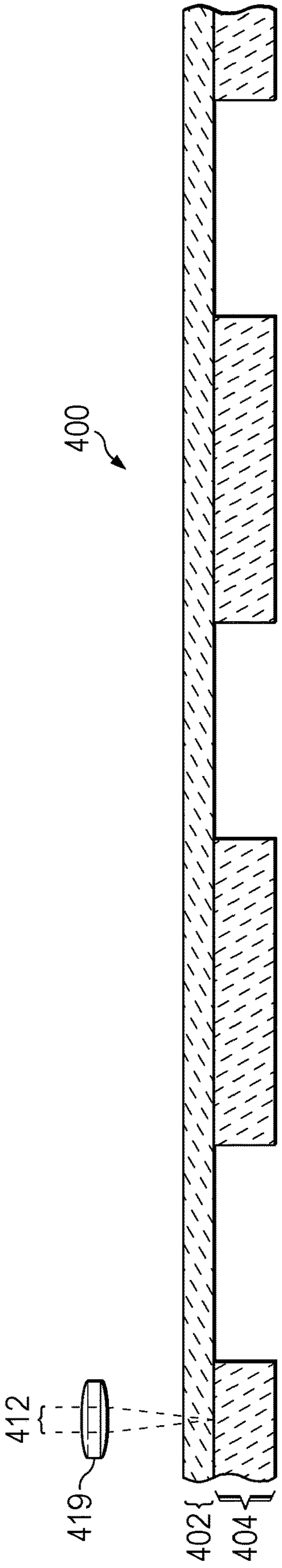

FIG. 4C provides cross-sectional views of respective portions of the substrates 402 and 404 shown in FIG. 4B. As shown in FIG. 4C, substrates 402 and 404 may be brought together to form junctions between respective opposing surfaces. Substates 402 and 404 may then be sealed together at the connecting junctions therebetween.

To seal substrates 402 and 404 together, one or more laser beams, such as laser beam 412, may be transmitted through substrate 402 with sufficient power and focus to locally melt respective opposing surfaces of substrates 402 and 404 along their junctions. Multiple laser beams can be transmitted simultaneously, or sequentially following a scanning pattern. A lens 419 may be used to focus the laser beam 412 at the precise depth (e.g., from a surface of substrate 402 receiving laser beam 412) where respective opposing surfaces of substrates 402 and 404 are to be melted to bond and seal the opposing surfaces together. The localized melting of opposing surfaces of substrates 402 and 404 may be achieved without releasing any contaminating gas into the interior of containers 401. The resultant melted junctures may form a hermetic seal between respective opposing surfaces of substrates 402 and 404 at desired locations, including at least around an entire perimeter of each container 401 along the plane at which substrates 402 and 404 are joined. In some examples, laser beam 412 may be directed across substrates 402 and 404 to the appropriate junction locations by moving the laser beam 412 relative to the joined substrates 402 and 404 or by moving the joined substrates 402 and 404 relative to laser beam 412.

Figure 4D:
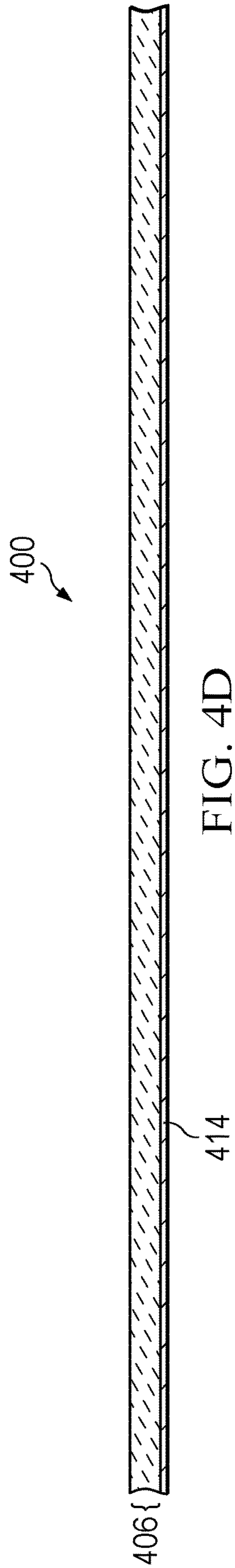

FIG. 4D provides a cross-sectional view of a portion of substrate 406, after the formation of a metallization layer 414 on an outer surface thereof. In some examples, metallization layer 414 can be formed on substrate 406 after substrate 406 is joined and sealed with substrate 404.

Figure 4E:
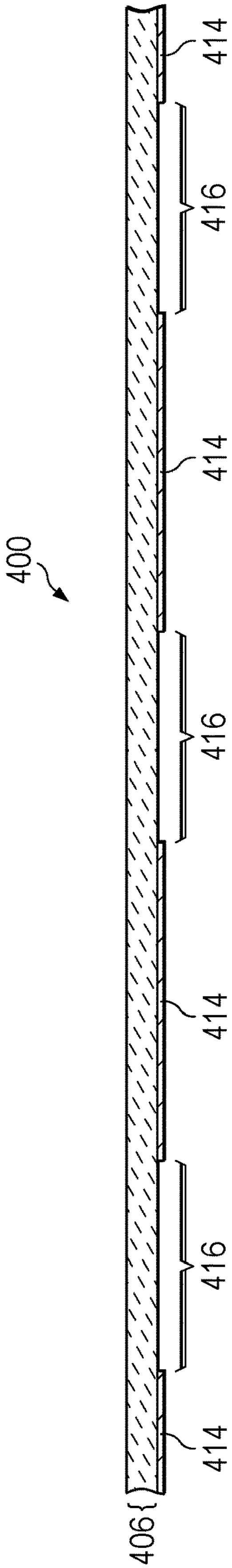

FIG. 4E provides a cross-sectional view of the portion of the substrate 406 shown in FIG. 4D, after the selective removal of portions of the metallization layer 414. The selective removal of metallization layer 414 may result in the formation of windows 416, with each window 416 exposing a respective underlying surface of substrate 406. Windows 416 may be substantially similar in structure and function to window 204 of FIGS. 2A-2B or windows 306, 308 of FIGS. 3A-3B. FIG. 4M provides a plan view of an example of how windows 416 may be positioned relative to one another within a metallization layer 414 formed on an outer surface of substrate 406.

Figure 4F:
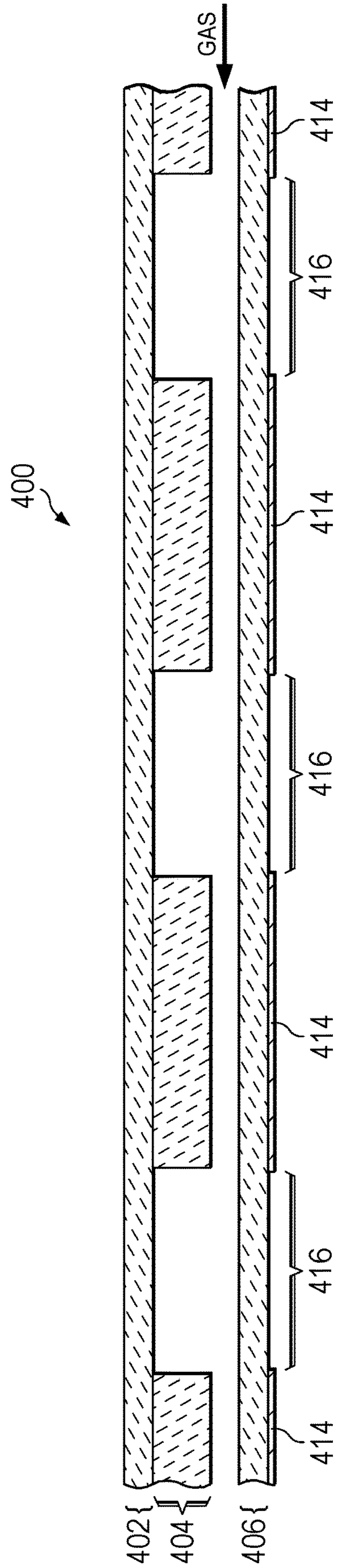

FIG. 4F provides cross-sectional views of respective portions of sealed substrates 402 and 404, together with substrate 406. As shown in FIG. 4F, while substrates 402-406 are placed within a chamber filled with a dipolar gas, the sealed substrates 402 and 404 may be brought together with substrate 406. Substrate 404 and 406 may be aligned with respect to one another, such that each window 416 within metallic layer 414 is generally aligned with a respective gap in substrate 404 corresponding to a portion of a container 401. In some alternative examples, the alignment of substrates 402-406 may be similar to what is shown in FIG. 4F, but the formation of metallization layer 414 and the subsequent formation of windows 416 by selective removal of portions of that layer 414 may both be performed sometime after substrate 404 is sealed to substrate 406, to avoid the metallization layer 414 contaminating the gas in the chamber and in the cavities between substrates 402, 404, and 406.

Figure 4G:
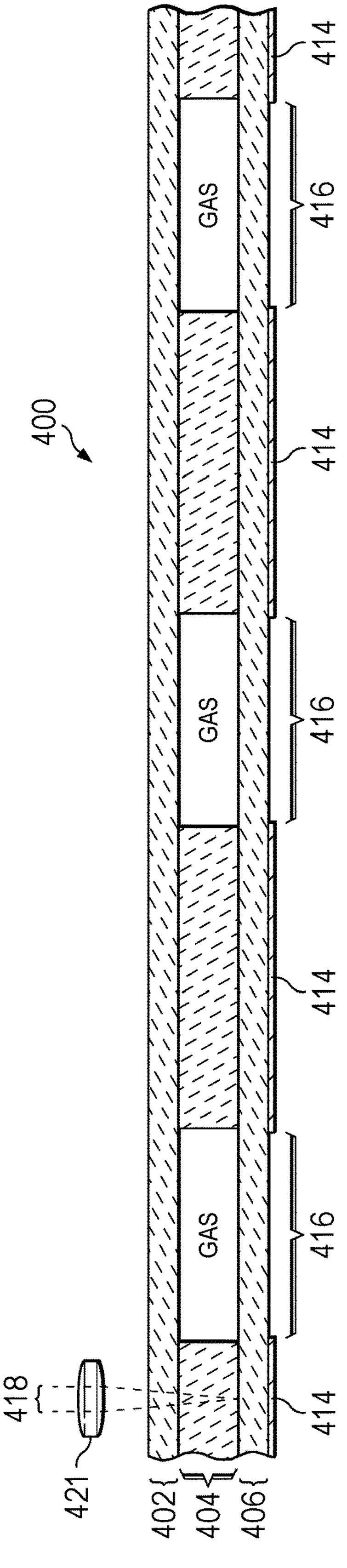

FIG. 4G provides cross-sectional views of the joining of sealed substrates 402 and 404 to substrate 406. As shown in FIG. 4G, sealed substrates 402 and 404 may be brought together with substrate 406 to form junctions between respective opposing surfaces of substrates 404 and 406. Substates 404 and 406 may then be sealed together at the connecting junctions therebetween.

To seal substrates 404 and 406 together, a laser beam 418 may be transmitted through substrates 402 and 404 with sufficient power and focus to locally melt respective opposing surfaces of substrates 404 and 406 along their junctions. A lens 421 may be used to focus the laser beam 418 at the precise depth where respective opposing surfaces of substrates 404 and 406 are to be melted and sealed together. The localized melting of opposing surfaces of substrates 404 and 406 may be achieved without releasing any contaminating gas into the interior of containers 401. The resultant melted junctures may form a hermetic seal between respective opposing surfaces of substrates 404 and 406 at desired locations, including at least around an entire perimeter of each container 401 along the plane at which substrates 404 and 406 are joined. In some examples, laser beam 418 may be directed across substrates 402-406 to the appropriate junction locations by moving the laser beam 418 relative to the joined substrates 402-406 or by moving the joined substrates 402-406 relative to laser beam 418.

Figure 4H:
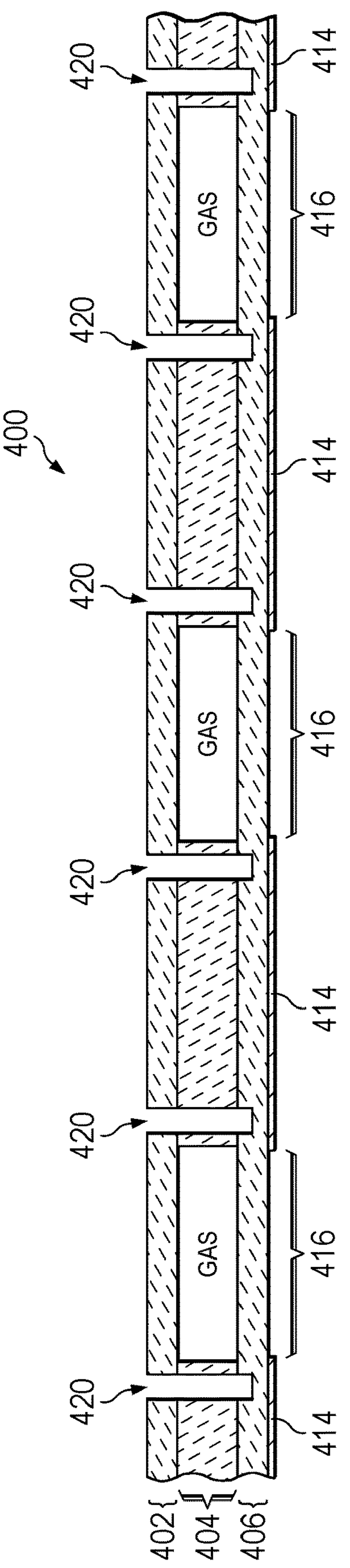

FIG. 4H provides a cross-sectional view of respective portions of the sealed-together substrates 402-406 shown FIG. 4G, after the formation of trenches 420 around containers 401. Trenches 420 may be formed, for examples, using one or more LIDE processes. As shown in FIG. 4H, each trench 420 may have a depth that extends fully through substrates 402 and 404 and partially into substate 406. In certain alternative examples, however, trenches 420 may each have a depth that extends only into substrate 402, without further extending in substrates 404 and 406, or trenches 420 may each have a depth that extends only into substrates 402 and 404, without further extending into substrate 406.

Figure 4I:
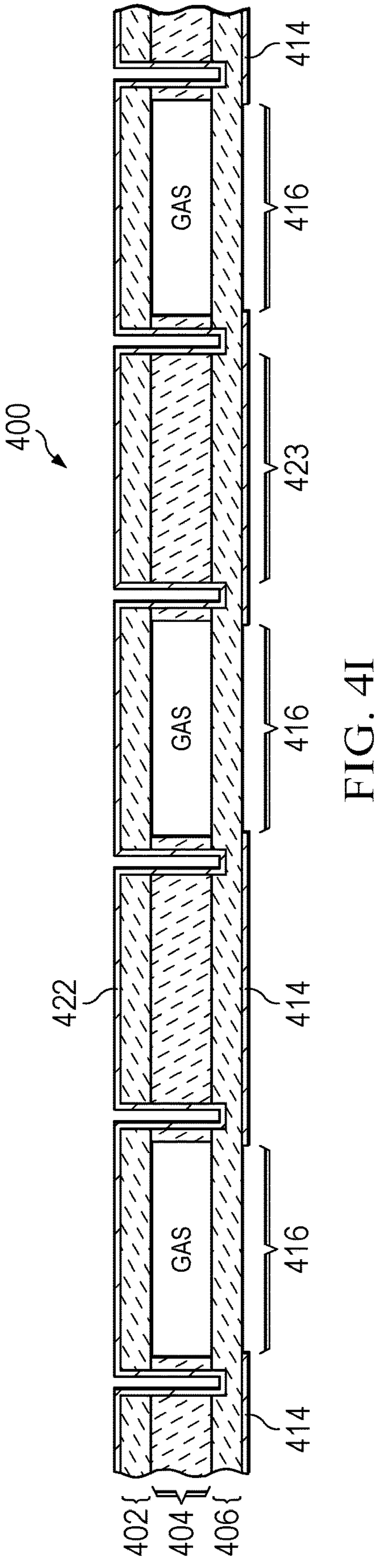

FIG. 4I provides a cross-sectional view of respective portions of the sealed-together substrates 402-406 shown FIG. 4H, after the formation of a metallization layer 422 on an outer surface of substrate 420, including within the inner walls of trenches 420. Region 423 indicates an area that may allow the propagation of an undesired EMF (e.g., through at least substrate 406) in a lateral direction between first and second ends of a gas-filled container 401. To reduce such EMF crosstalk, region 423 may be modified to have one or more EBG features, as described further with reference to FIG. 4J.

Figure 4J:
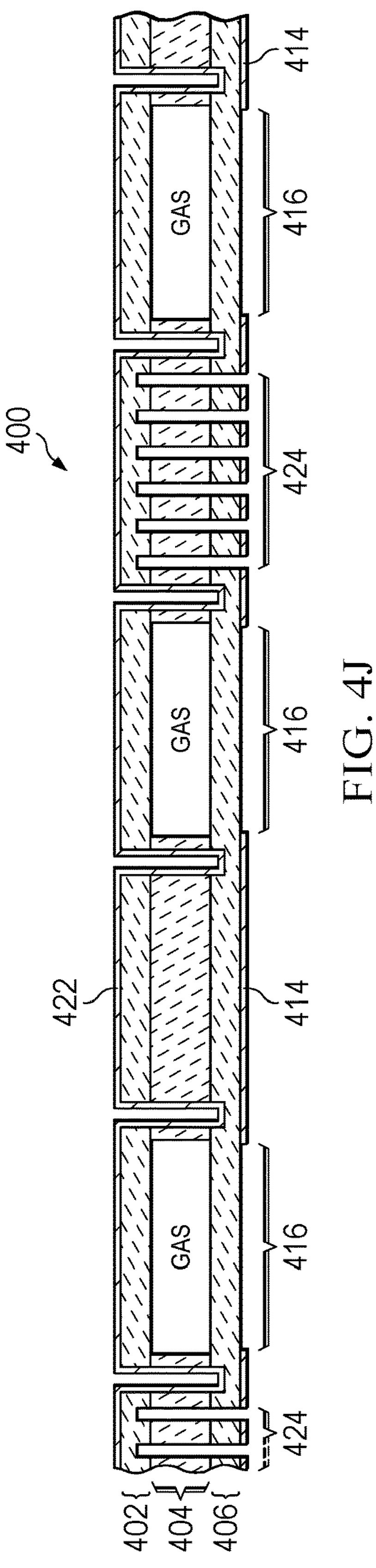

FIG. 4J provides a cross-sectional view of respective portions of the sealed-together substrates 402-406 shown FIG. 4I, after the formation of voids within regions 424. Each void may extend fully through substrate 406 in a linear direction normal to the outer surface of substrate 406. In addition, each void may further extend at least partially through respective portions of substates 404 and 402. The voids within regions 424 may be formed, for example, using one or more LIDE processes. The voids within regions 424 may be substantially similar in structure and function to the voids within regions 324 described with reference to FIG. 3B. For example, the voids within regions 424 may be arranged to collectively provide an EBG within region 424.

In certain alternative examples, the voids and trenches may be inverted with respect to one another from the perspective of what is shown in FIG. 4J. To form voids within region 424 in a top-down direction, for example, one or more LIDE processes may be used to etch fully through substrate 402 and at least partially through substates 404 and 406, though not fully through substrate 406. The trenches 420 may then be formed in the opposite a bottom-up direction.

Figure 4K:
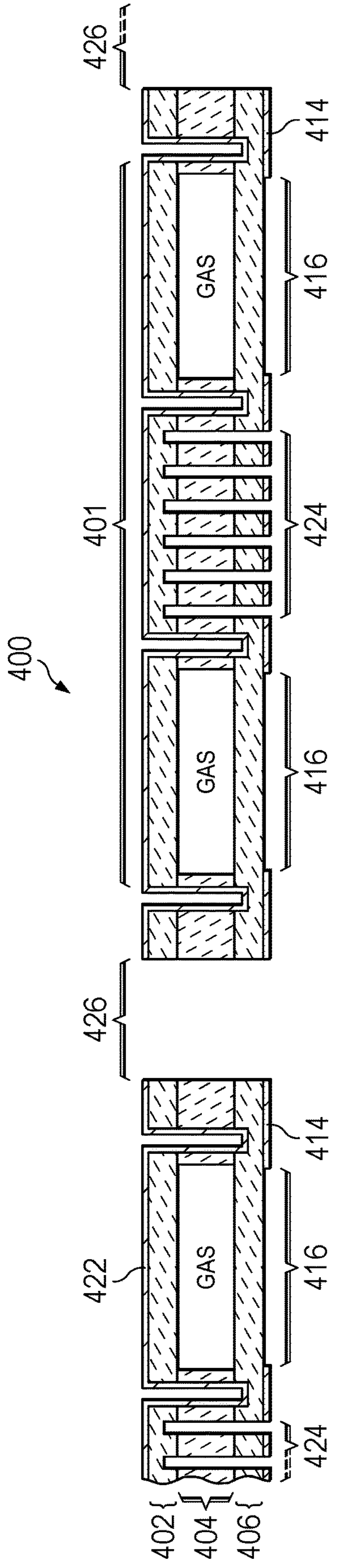
Figure 4L:
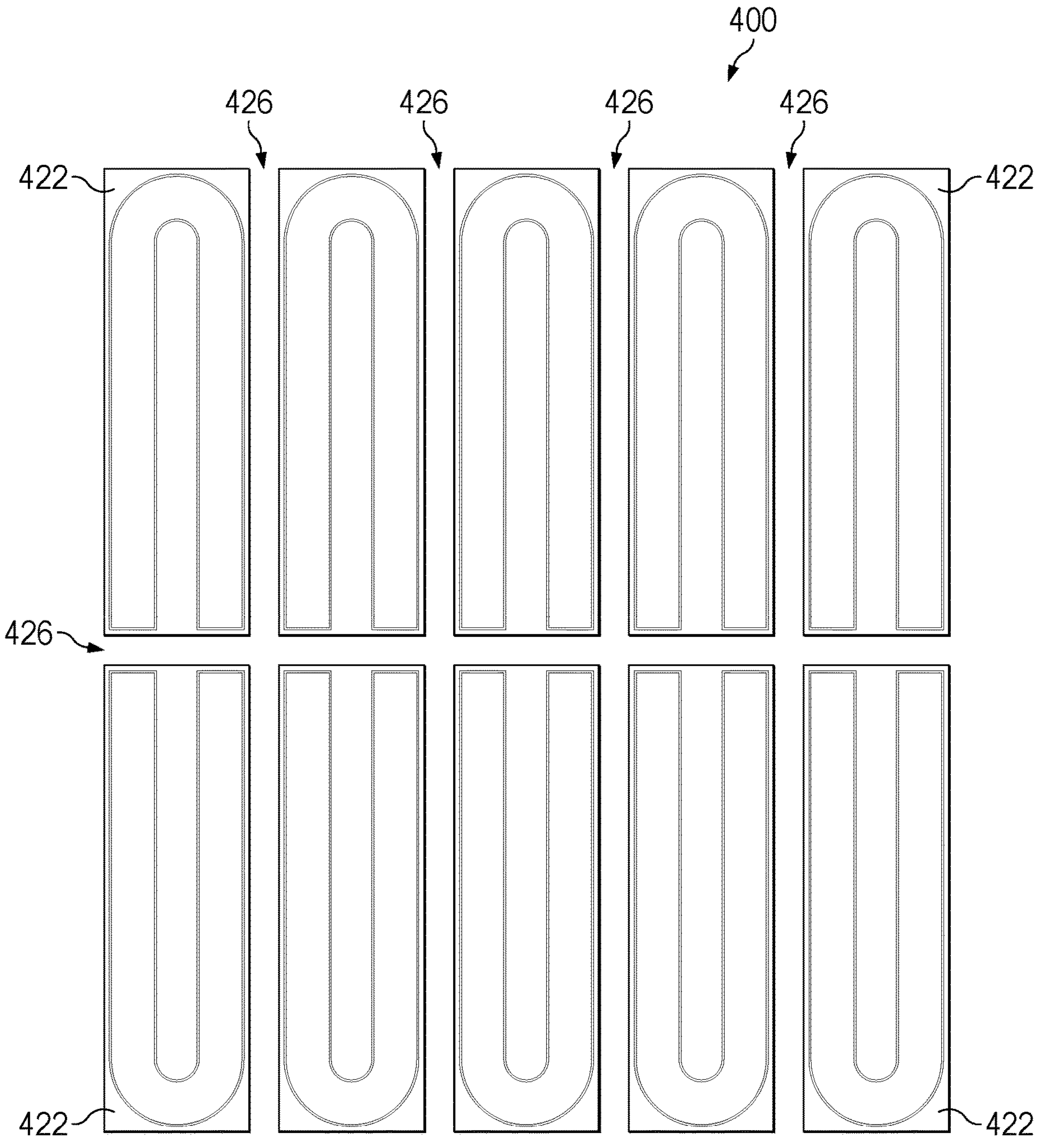
Figure 4M:
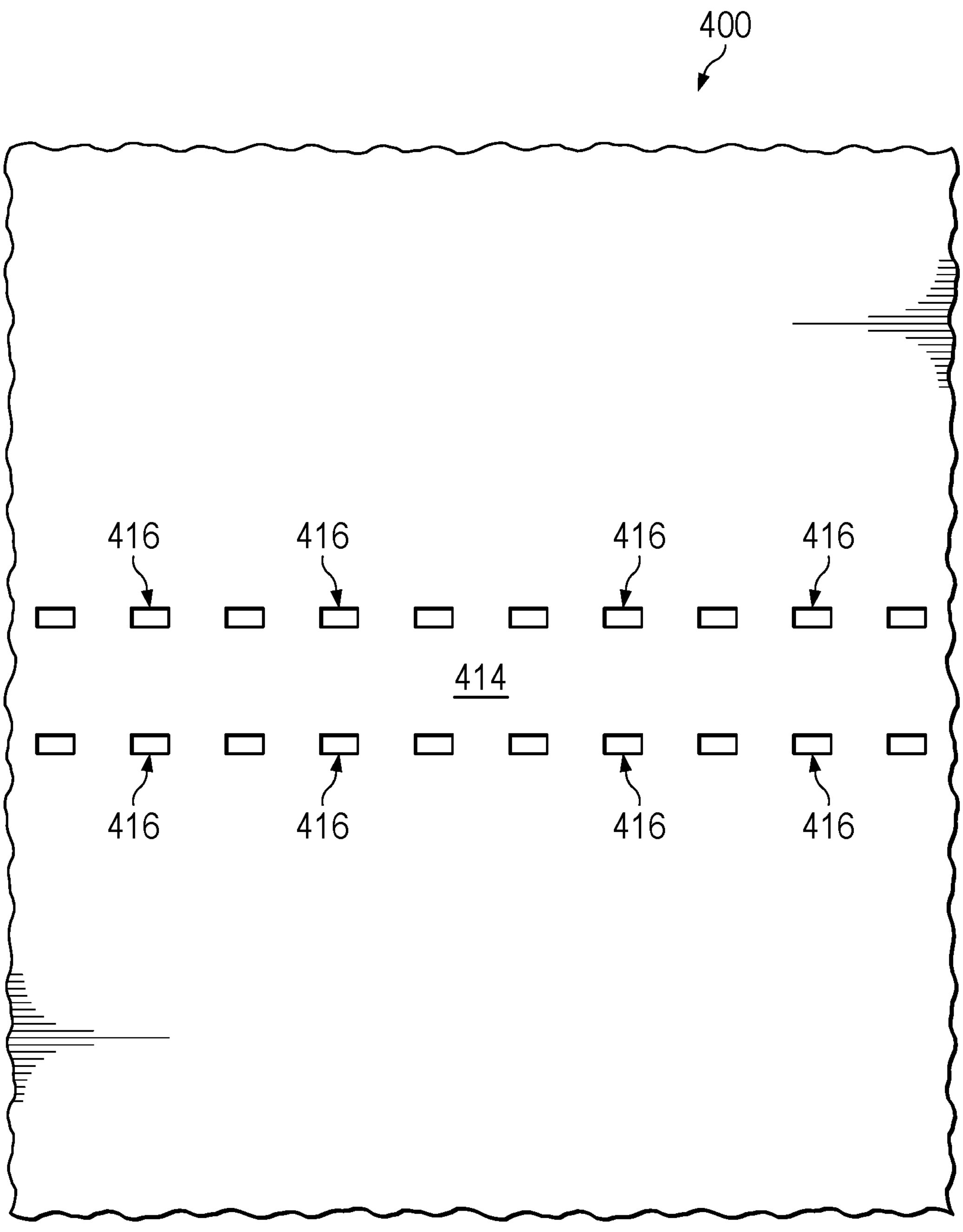

FIGS. 4K and 4L illustrate a cross-section view and a top view, respectively, of example axes 426 along which containers 401 are singulated from another.

The example method of fabricating vapor cells illustrated in FIGS. 4A-4M can be performed using various semiconductor fabrication techniques, including photolithography, etching, metallization, alignment techniques, etc., to align and singulate the substrates and to form various features (e.g., reflective coating, EBG, etc., which allows mass production of hermetically sealed containers with well-controlled properties at reduced cost. Also, the sealing of the substrates using localized heating can avoid using other sealing materials (e.g., metal) which may otherwise react with the dipolar gas and affect the long term stability of the vapor cell. Further, the precision and speed of the localized heating can be improved by, for example, using optical techniques to focus the laser beams that perform the localized heating, project multiple laser beams, etc. All these can improve the precision and speed in fabricating the vapor cells, and improving the long-term stability of vapor cells, while reducing the cost of fabrication.

Figure 5A:
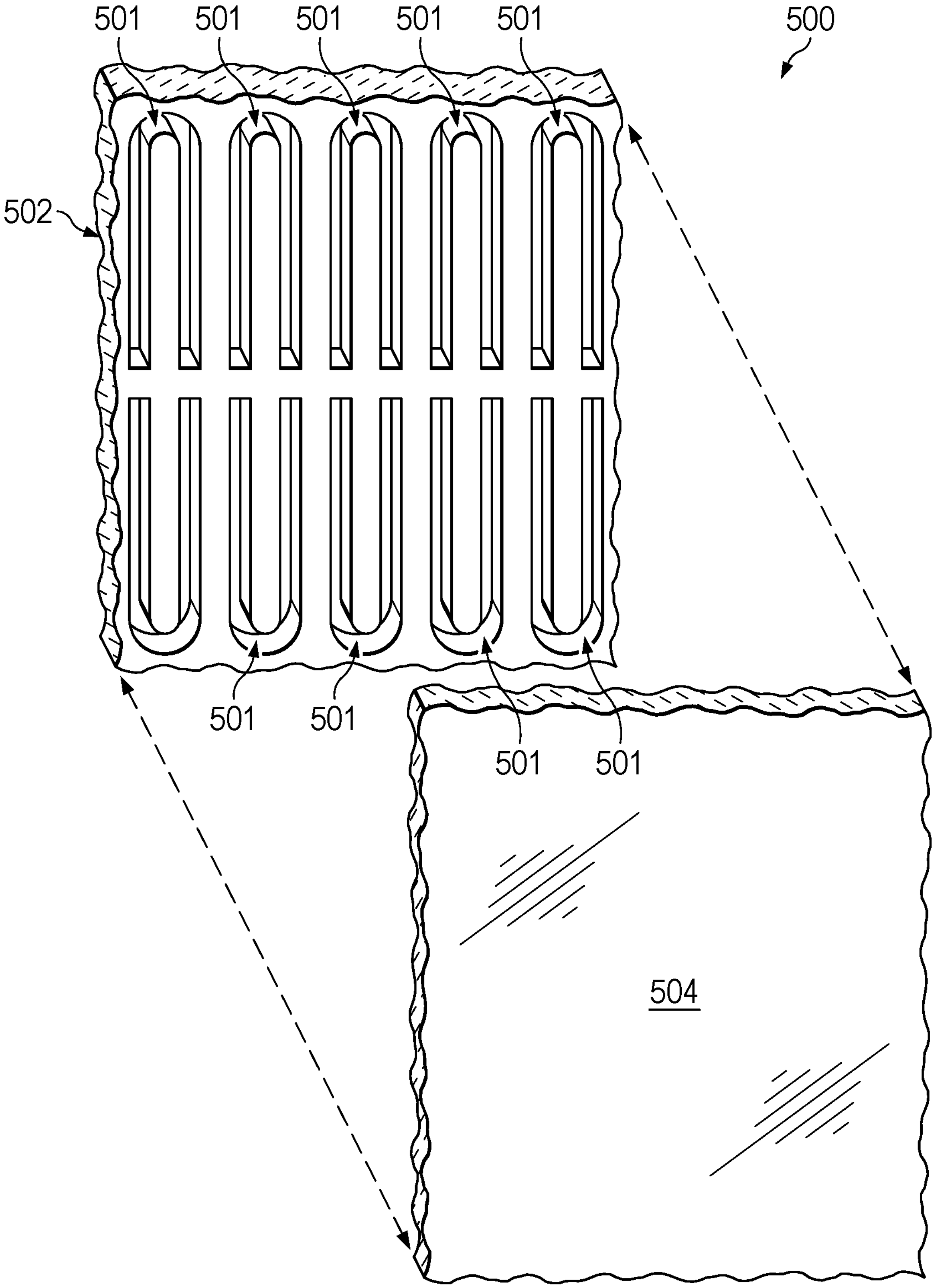
FIGS. 5A through 5C are schematics showing a method of forming vapor cells, according to some examples.
Figure 5B:
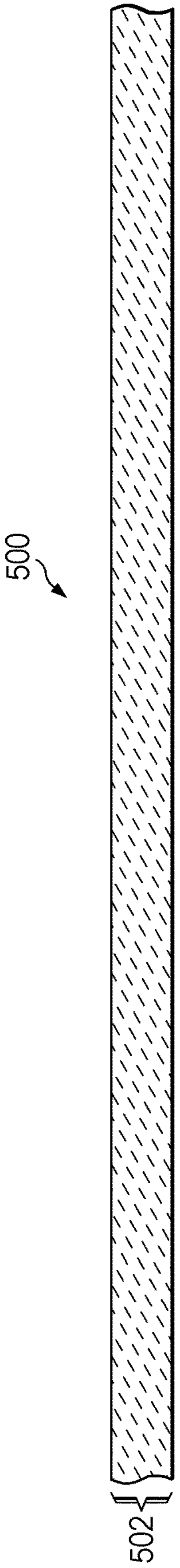
Figure 5C:
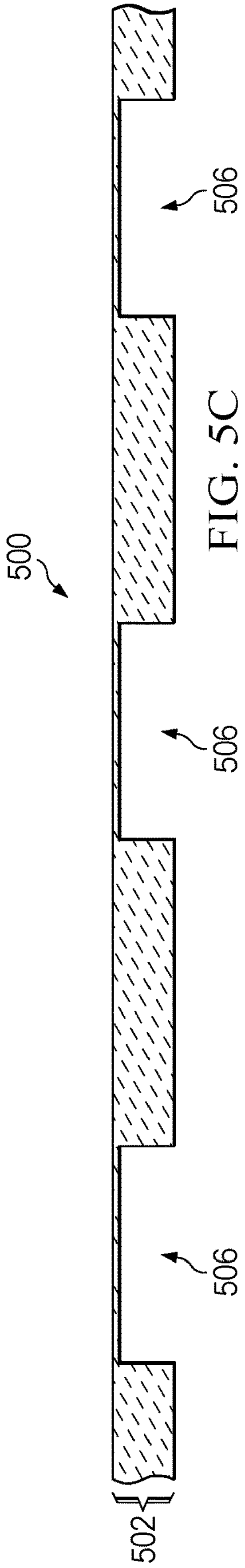

FIGS. 5A through 5C show respective views of two substrates that may be processed and sealed together to form an array of gas-filled containers according to an alternative example. In some examples, each fully-fabricated container may be a vapor cell that encloses a dipolar gas entirely within glass.

FIG. 5A provides top-views of respective portions of two substrates 502 and 504 that configured to be sealed together to collectively form an array of gas-filled containers 501. The fabrication of containers 501 may involve hermetically sealing only two substrates (502, 504) together while they are immersed within a dipolar gas, with at least one of the two substrates (e.g., 502) being hollowed out to form a cavity that at least partially defines the interior walls of containers 501. As shown in FIG. 5A, each container 401 may have a non-linear shape (e.g., a U-shape), but containers 501 may have any suitable shape.

In some examples, substrates 502 and 504 may satisfy one or more of the following requirements: (1) they are not reflective to a laser beam; (2) they have a dielectric constant lower than 5; (3) they have a loss tangent at millimeter-wave frequencies lower than 0.025; and (4) they are not chemically reactive with the dipolar gas being enclosed. Certain glass material may satisfy all four qualifications. Example glass that can be used to form container 302 includes Borofloat33®, AF32®, and D263® (all manufactured by Schott AG), some of which may include Borosilicate.

FIG. 5B illustrates a cross-sectional view of a portion of substate 502 prior to selective removal of portions therefrom to form interior walls of containers 501. FIG. 5C illustrates the same cross-sectional view of the portion of substrate 502 illustrated in 5B, albeit after the selective removal of portions therefrom to form trenches 506 defining interior walls of containers 501. The formation of trenches 506 within substrate 502 may be effected, for example, using one or more LIDE processes.

The formation of trenches 506 in substrate 502 facilitates the formation of containers 501 by sealing only two substrates together, rather than interposing a spacer substrate between two substrates (e.g., as shown in FIGS. 4A through 4M). After the selective removal of material from substrate 502, as shown in FIG. 5C, substrate 502 may be substantially similar in structure to substrate 402. Accordingly, the example processing described with reference to FIGS. 4F through 4M may likewise be performed in fabricating containers using substrates 502 and 504 shown in FIGS. 5A-5C.

Figure 6:
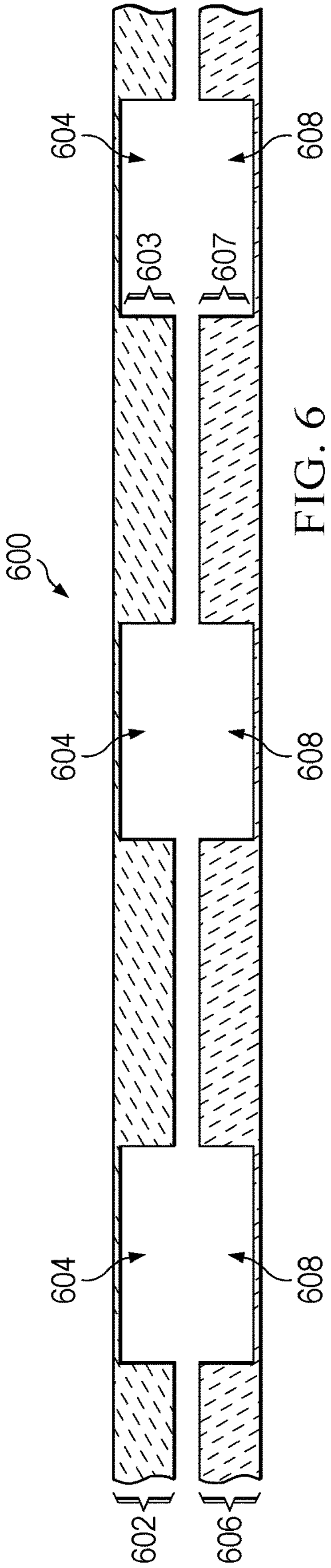
FIG. 6 is a schematic illustrating cross-sectional views of respective portions of two substrates that can be joined and sealed to form vapor cells.

FIG. 6 illustrates cross-sectional views of respective portions of two substates 602 and 606 that have respective trenches 604 and 608 formed therein, in which substrates 602 and 606 are configured to be sealed together to collectively form an array of gas-filled containers. In this example, substrate 602 has trenches 604 selectively removed therefrom and substrate 608 has trenches 608 selectively removed therefrom. Trenches 604 and 608 may be formed, for example, using one or more LIDE processes. Substrates 602 and 606 may be placed in a gas-filled chamber, brought together to form junctions therebetween and sealed together to enclose gas within multiple containers.

The trenches 604 and 608 may be aligned, when substrates 602 and 606 are brought together in a gas-filled chamber, such that each trench 604 formed in substrate 602 has a respective opposing trench 608 formed in substrate 606. Substrates 604 and 608 may be joined together and sealed using a laser beam focused at the junctions between respective opposing surfaces of substrates 604 and 608. Similar to the description of FIGS. 4C and 4G, the laser beam may have sufficient power and focus to melt the junction between opposing respective surfaces of substrates 602 and 604, thereby sealing substrates 602 and 604 together in a manner that encloses a dipolar gas within containers defined by trenches 602 and 606.

Figure 7A:
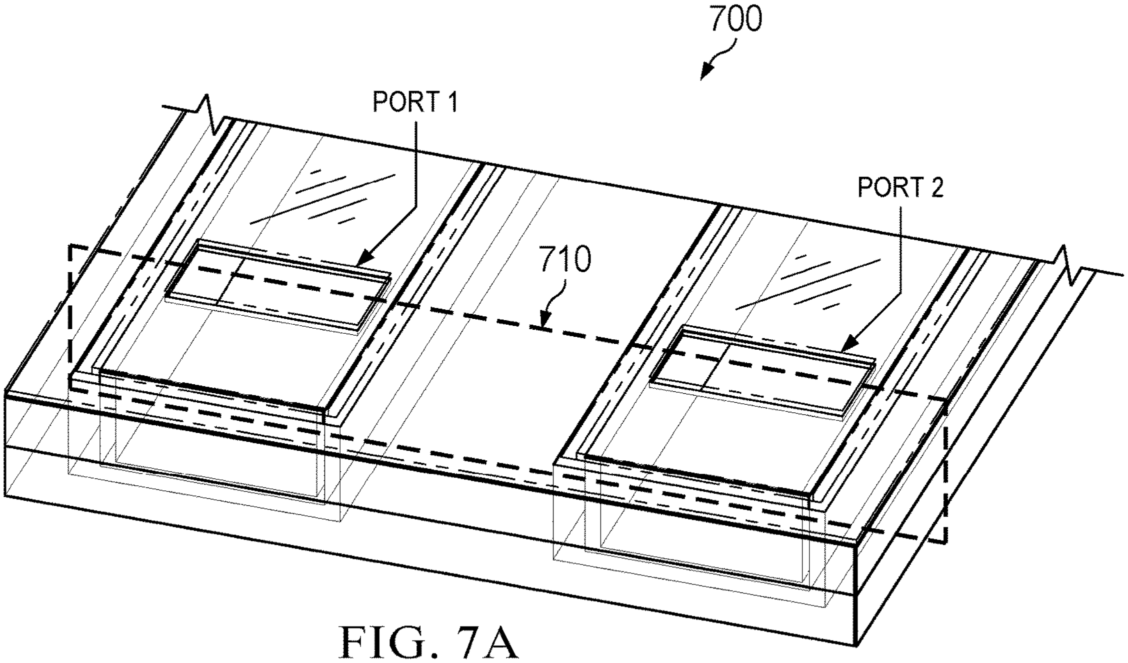
FIG. 7A is a schematic illustrating an oblique parallel projection view of a glass container enclosing a dipolar gas, according to some examples.

FIG. 7A is an oblique parallel projection view of a glass container 700 enclosing a dipolar gas and having a first Port 1 positioned proximate a first end a second Port 2 positioned proximate a second end. Glass container 700 may be incorporated, for example, into the quantum transition frequency detector system 300 of FIG. 3A. Port 1 and Port 2 may be substantially similar in structure and function to windows 308 and 306, respectively of FIGS. 3A-3B. In this example, glass container 700 has a non-linear shape extending from the first end of container 700 to the second end of container 700 along a plurality of axes.

Figure 7B:
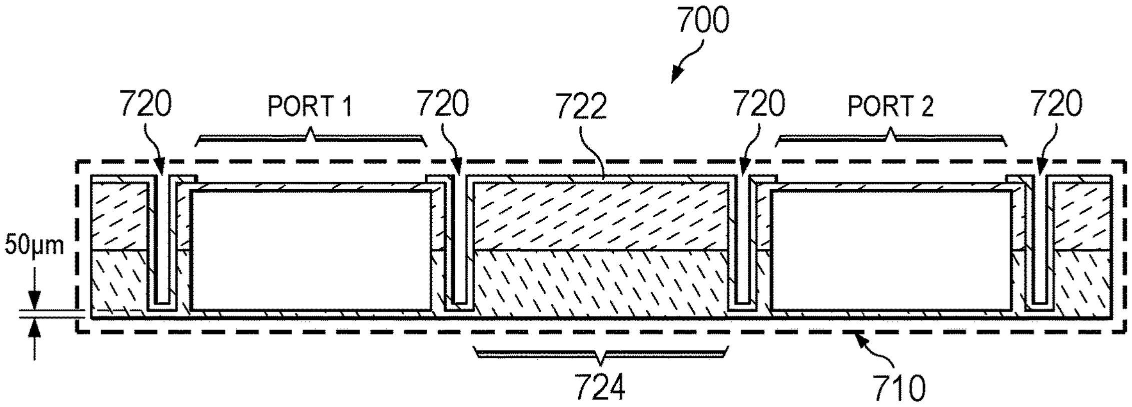
FIG. 7B is a schematic illustrating a cross-sectional view of the glass container of FIG. 7A, according to some examples.

FIG. 7B provides a cross-sectional view (along cross-sectional plane 710) of the glass container 700 of FIG. 7A. As shown in FIG. 7B, an EM reflective coating 722 covers at least part of the outer surfaces of glass container 700, including within the trenches 720 shown. At least two coated trenches 720 are located between Port 1 and Port 2. Two additional coated trenches 720 are located opposite Port 1 and Port 2, respectively. The EM reflective coating 722 includes an opening corresponding to Port 1 and another opening corresponding to Port 2. The EM reflective coating 722 may include any suitable material capable of reducing or blocking an undesired EMF. In some examples, EM reflective coating 722 may include one or more layers of metal (e.g., Au, Cu, Al, Cr, or Ti). In this example, container 700 is not illustrated has having EBG features in the region 724 between Port 1 and Port 2. Nevertheless, EBG features may be added to container 700 using, for example, processing techniques substantially similar to those described above for voids 324 and 424.

Figure 8A:
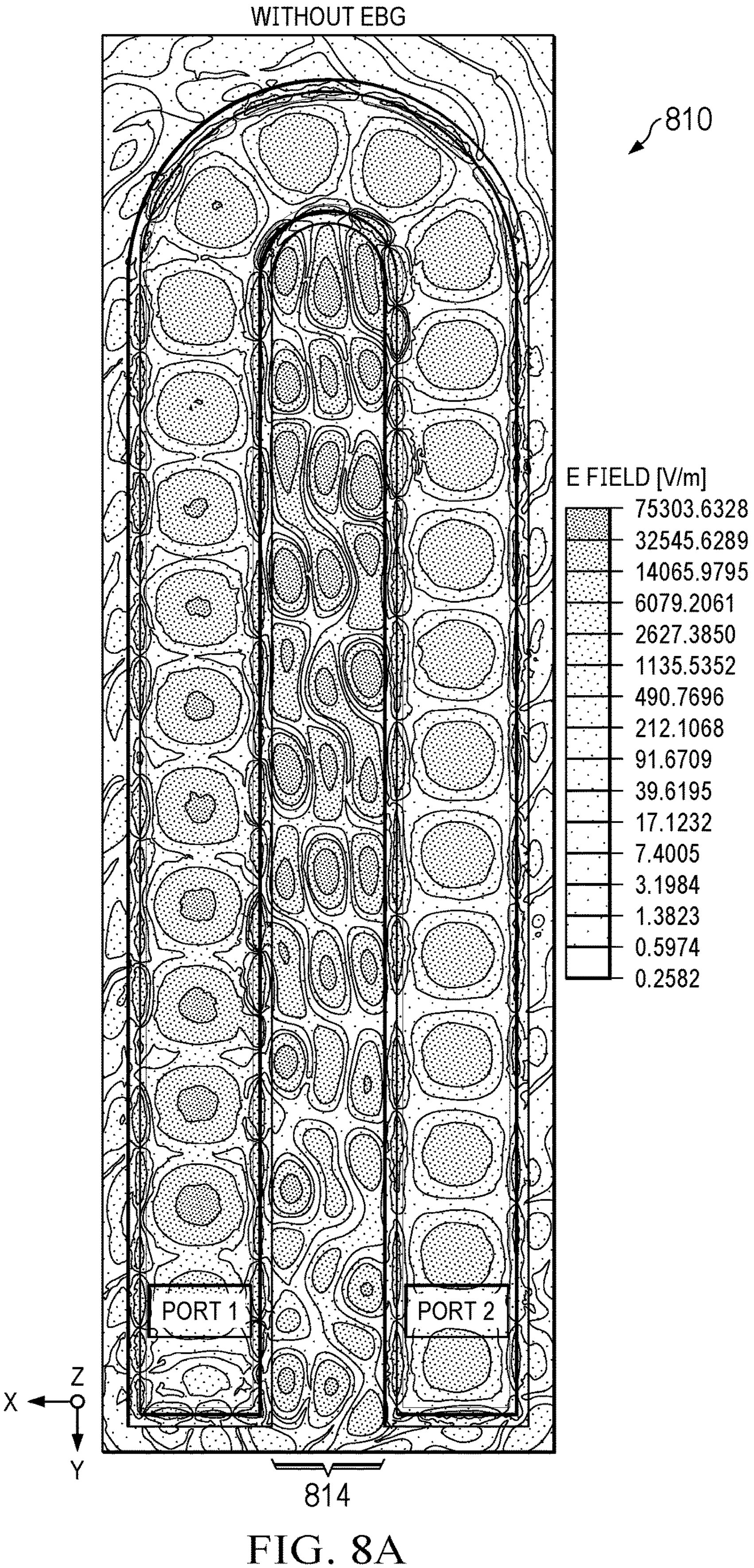
FIGS. 8A and 8B are graphs that provide comparisons of lateral leakage of an electromagnetic field by alternative vapor cells.
Figure 8B:
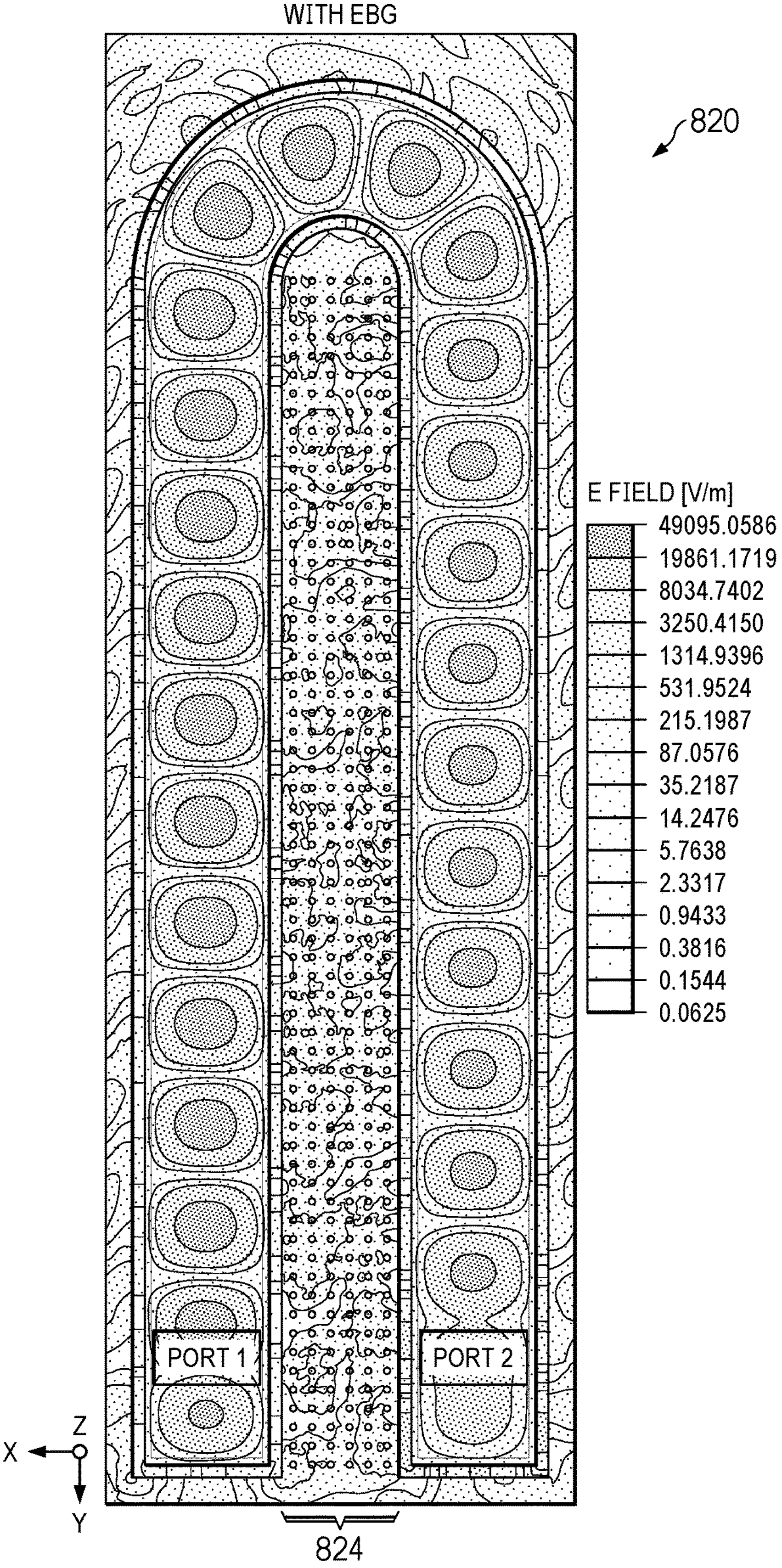

FIGS. 8A and 8B are graphs that provide comparisons of EMF leakage generated in vapor cells 810 and 820, respectively. Vapor cells 810 and 820 are structurally identical apart from vapor cell 820 including EBG features in region 824, whereas vapor cell 810 has no such EBG features in corresponding region 814. FIGS. 8A and 8B show an example EMF as laterally leaking (along the negative x-axis) within respective regions (814, 824) extending vertically (along the negative y-axis) between Port 1 and Port 2 as a result of either the exclusion (FIG. 8A) or inclusion (FIG. 8B) of EBG features within those regions (814, 824).

As shown in FIG. 8A, due at least in part to the exclusion of EBG features in the region 814 shown, a significant amount of EMF leaks in a lateral direction along the negative x-axis from Port 1 to Port 2. In certain applications, such lateral leakage may produce undesirable crosstalk that degrades the EM performance of glass container 810.

Relative to FIG. 8A, FIG. 8B shows significantly less EMF leakage in region 824 between Port 1 and Port 2. The relative reduction is due at least in part to the inclusion of EBG features in region 824. In certain applications, the reduction of lateral leakage may minimize undesirable crosstalk and thereby improve the EM performance of vapor cell 820 (e.g., relative to vapor cell 810).

Figure 9:
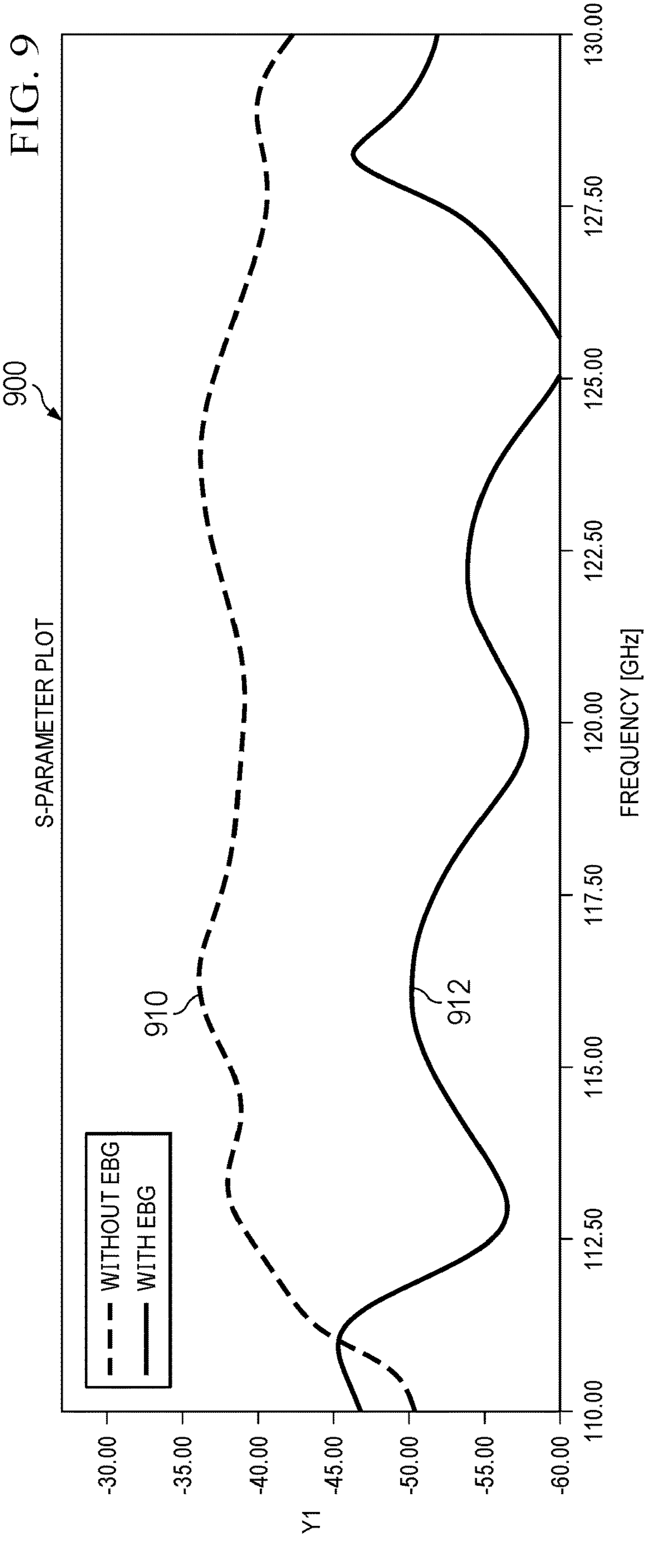
FIG. 9 shows two scattering parameter graphs quantifying the simulated lateral leakage of an electromagnetic field for respective vapor cells illustrated in FIGS. 8A and 8B.

FIG. 9 shows two scattering parameter (S-parameter) graphs 910 and 920 quantifying the simulated lateral EMF leakage for respective containers 810 and 820 shown in FIGS. 8A and 8B over a frequency range between 110 GHz and 130 GHz. As shown in FIG. 9, the inclusion of EBG features within region 824 of container 820 (shown in FIG. 8B) may result in a substantial reduction in EMF lateral leakage relative to the exclusion of such EBG features.

Figure 10:
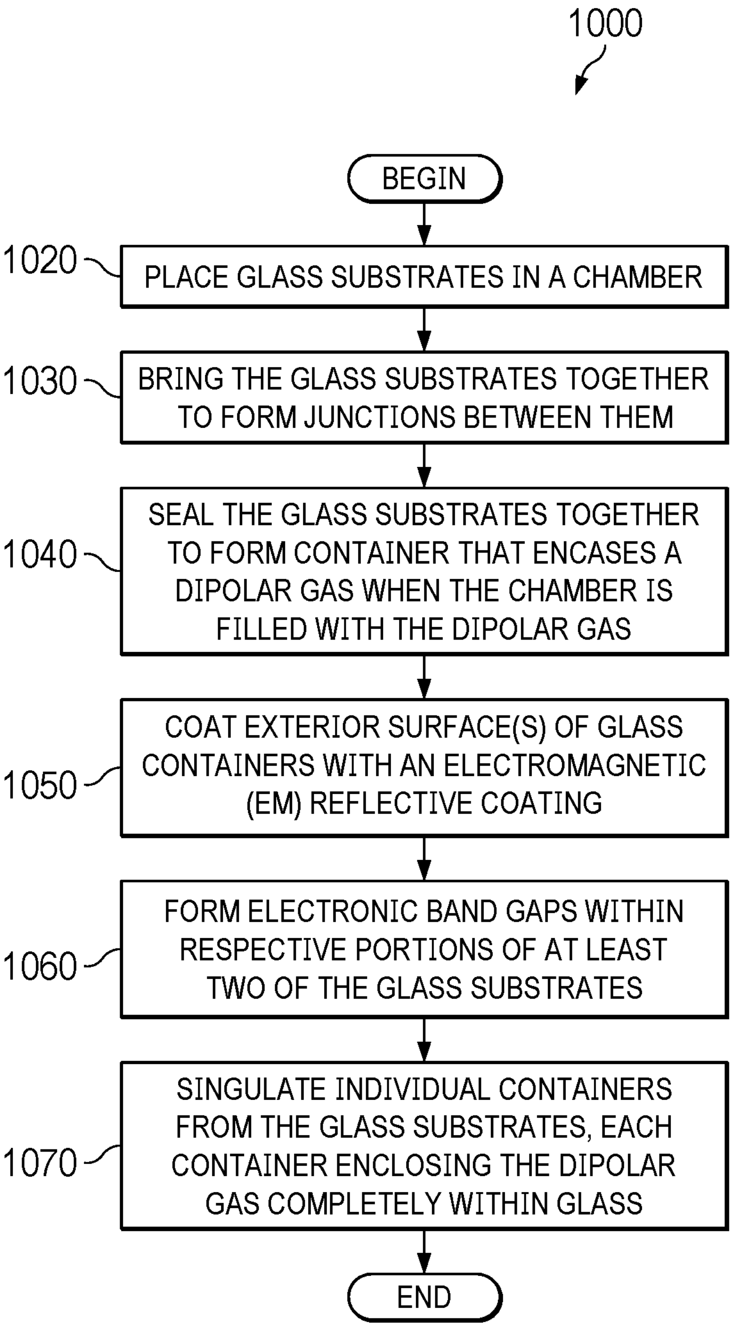
FIG. 10 is a flowchart illustrating an example method of fabricating one or more glass vapor cells.

FIG. 10 is a flowchart illustrating an example method 1000 of fabricating a vapor cell, such as may be used in a quantum transition frequency detector like detector 100 of FIG. 1. Multiple glass substrates are used to form surfaces that when joined collectively define cavities for glass containers. The glass substrates are placed in a chamber (1020). The glass substrates are brought together to form junctions between them (1030). The glass substrates are sealed together by focusing a laser beam at the junctions (1040) when the chamber is filled with a dipolar gas. Sealing the junction between the glass containers forms a glass container that encases the dipolar gas. As examples, the dipolar gas can be $H_2O$, $CH_3CN$, $HC_3N$, $NH_3$, OCS, HCN, or $H_2S$.

One or more exterior surfaces of the glass containers are coated with an EM reflective coating (1050), while providing each container with TX and RX windows defined by the absence of such EM reflective coating. The windows can be provided, for example, either by not coating the container at the region of the window during the coating, or by post-coating removal of the coating at the region of the window (e.g., by photolithographic etching or laser ablating). Examples of containers that may be coated in this manner are described with reference to FIGS. 2A-2C, 3A-3C, 4A-4M, 5A-5C, 6, 7A-7B, and 8A-8B. One or more EBG features are formed within respective portions of at least two of the glass substates (1060). Examples of containers that may include such EBG features are described with reference to FIGS. 3A-3C, 4A-4M, 5A-5C, 6, 7A-7B, and 8B. Individual containers are singulated from the glass substrates (1070). Each singulated container may enclose the dipolar gas completely within glass, such that the dipolar gas is in contact with glass only.

Figure 11:
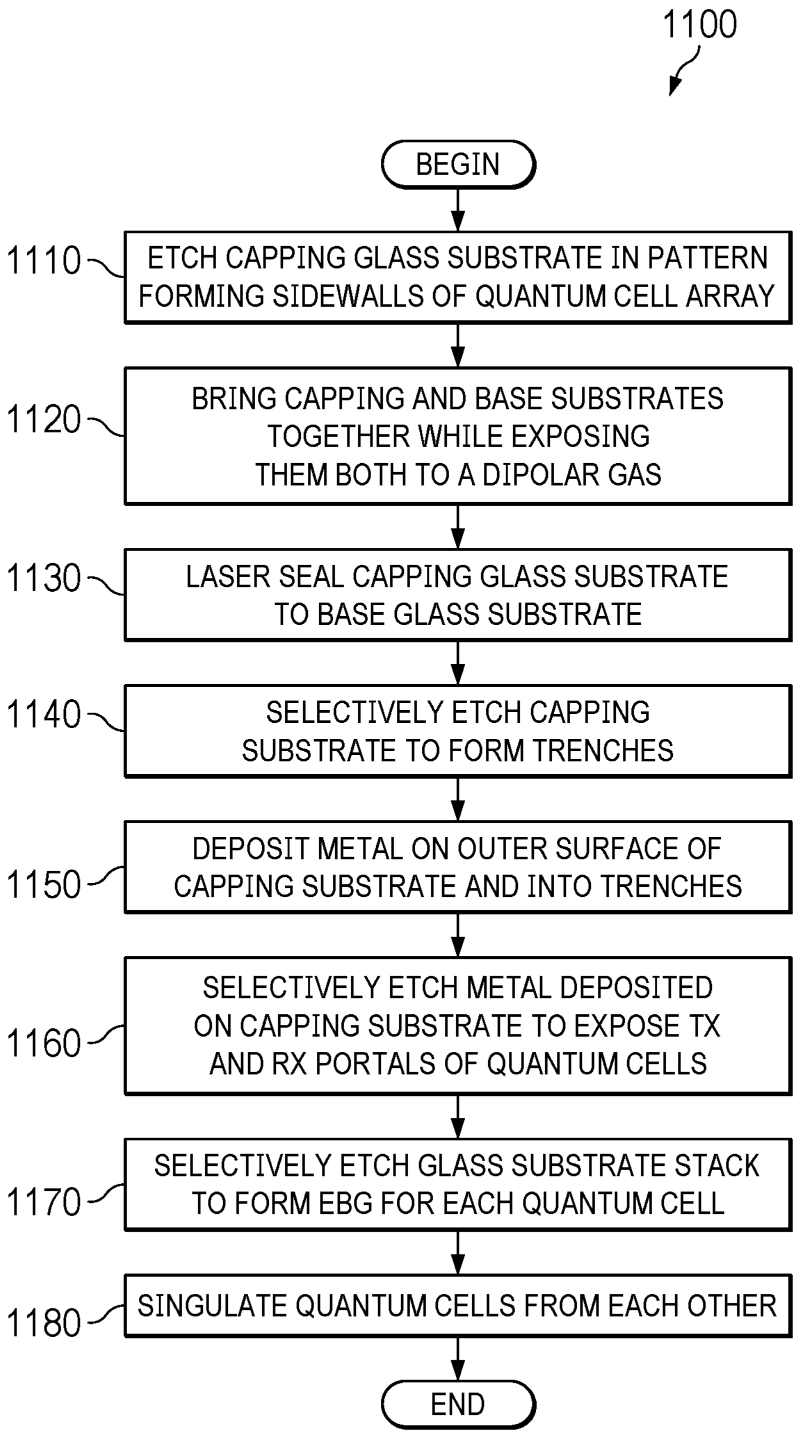
FIG. 11 is a flowchart illustrating another example method of fabricating an array of glass vapor cells having a non-linear shape.

FIG. 11 is a flowchart illustrating another example method 1100 of fabricating an array of glass vapor cells having a non-linear shape. A capping glass substrate is etched in a pattern forming sidewalls of an array of quantum cells (1110). The capping and base substrates are brought together while being exposed to a dipolar gas (1120). Once joined, the capping substrate is laser sealed to the base substate (1130). A portion of the capping substrate is selectively etched to form trenches (1140). Additional detail concerning example trenches are described with reference to FIGS. 4H-4I and 6. Metal is deposited on an outer surface of the capping substrate, including within the trenches formed within the capping substrate (1150). The metal deposited on the capping substate is selectively etched to expose TX and RX portals for each quantum cell (1160). Respective portions of the capping and base substrates are selectively etched to form an EBG features between first and second ends of each quantum cell (1170). The quantum cells are singulated from each other (1180). Additional detail of concerning the singulation of quantum cells from each other is described further with reference to FIGS. 4K and 4L.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead with little or no change to the remaining circuitry. For example, a field effect transistor ("FET") (such as an n-channel FET (NFET) or a p-channel FET (PFET)), a bipolar junction transistor (BJT—e.g., NPN transistor or PNP transistor), an insulated gate bipolar transistor (IGBT), and/or a junction field effect transistor (JFET) may be used in place of or in conjunction with the devices described herein. The transistors may be depletion mode devices, drain-extended devices, enhancement mode devices, natural transistors or other types of device structure transistors. Furthermore, the devices may be implemented in/over a silicon substrate (Si), a silicon carbide substrate (SiC), a gallium nitride substrate (GaN) or a gallium arsenide substrate (GaAs).

References may be made in the claims to a transistor's control input and its current terminals. In the context of a FET, the control input is the gate, and the current terminals are the drain and source. In the context of a BJT, the control input is the base, and the current terminals are the collector and emitter.

References herein to a FET being "on" or "enabled" means that the conduction channel of the FET is present and drain current may flow through the FET. References herein to a FET being "off" or "disabled" means that the conduction channel is not present so drain current does not flow through the FET. An "off" FET, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description.

In this description, unless otherwise stated, "about," "approximately" or "substantially" preceding a parameter means being within +/−10 percent of that parameter or, if the parameter is zero, a reasonable range of values around zero.

Modifications are possible in the described embodiments, and other embodiments are possible, within the scope of the claims.

What is claimed is:

1. A method, comprising:
forming a dielectric container that encloses a gas or a vapor by sealing a junction between opposing surfaces of a first dielectric substrate and a second dielectric substrate in a chamber that holds the gas or the vapor, at least one of the first or second dielectric substrate including an electronic band gap portion; and
forming an electromagnetic (EM) reflective coating on an outer surface of the dielectric container.

2. The method of claim 1, wherein the first dielectric substrate includes a spacer having one of the opposing surfaces.

3. The method of claim 1, wherein sealing the junction includes melting respective parts of the opposing surfaces to bond the opposing surfaces together.

4. The method of claim 3, wherein melting respective parts of the opposing surfaces to bond the opposing surfaces together includes projecting a laser beam onto the respective parts of the opposing surfaces.

5. The method of claim 4, wherein projecting the laser beam onto the respective parts of the opposing surfaces includes using an optical lens to focus the laser beam onto the respective parts of the opposing surfaces.

6. The method of claim 5, wherein projecting the laser beam onto the opposing surfaces includes projecting the laser beam through the first dielectric substrate.

7. The method of claim 1, wherein the dielectric container has a U-shape including two legs connected by a channel.

8. The method of claim 1, wherein:
the dielectric container has a first portion and a second portion; and
the electronic band gap portion is between the first and second portions of the dielectric container.

9. The method of claim 8, wherein the electronic band gap portion has an array of voids or trenches extending at least partially through the at least one of the first or second dielectric substrate.

10. The method of claim 9, wherein each void of the array of voids or each trench of the array of trenches has a metallic coating on an inner surface thereof.

11. The method of claim 1, wherein forming the EM reflective coating on the outer surface of the dielectric container includes depositing metal on the outer surface of the dielectric container.

12. The method of claim 1, further comprising selectively etching a portion of the first dielectric substrate to form a trench within the first dielectric substrate, wherein forming the EM reflective coating on the outer surface of the dielectric container includes forming the EM reflective coating within the trench.

13. An apparatus comprising:
a container including a first dielectric portion and a second dielectric portion sealed together and enclosing a gas or a vapor within the container, in which at least one of the first or second dielectric portion includes an electronic band gap portion, the container includes an electromagnetic (EM) reflective coating on an outer surface thereof, and the EM reflective coating includes an opening that allows an EM signal to propagate into or out of the container; and an antenna at the opening.

14. The apparatus of claim 13, wherein the first dielectric portion has a first surface, the second dielectric portion has a second surface, and the first and second dielectric portions are joined by the first surface being sealed to the second surface.

15. The apparatus of claim 14, wherein the first dielectric portion includes a spacer having the first surface.

16. The apparatus of claim 15, wherein the spacer is a first spacer, and the second dielectric portion includes a second spacer having the second surface.

17. The apparatus of claim 15, wherein the container has a linear shape extending from a first end of the container to a second end of the container.

18. The apparatus of claim 13, wherein the container has a non-linear shape extending from a first end of the container to a second end of the container.

19. The apparatus of claim 18, wherein the non-linear shape is a U-shape.

20. The apparatus of claim 19, wherein the electronic band gap portion is between two legs of the U-shape.

21. The apparatus of claim 20, wherein the electronic band gap portion has an array of voids.

22. The apparatus of claim 21, wherein each void of the array of voids has a metallic coating on an inner surface thereof.

23. The method of claim 1, wherein each of the first and second dielectric substrates includes at least one of a glass material or a borosilicate material.

24. The apparatus of claim 13, wherein each of the first and second dielectric portions includes at least one of a glass material or a borosilicate material.

25. A method comprising:

forming a dielectric container that encloses a gas or a vapor by sealing a junction between opposing surfaces of a first dielectric substrate and a second dielectric substrate in a chamber that holds the gas or the vapor, at least one of the first or second dielectric substrate including trenches or voids; and forming an electromagnetic (EM) reflective coating on an outer surface of the dielectric container.

26. The method of claim 25, wherein the EM reflective coating is in some of the trenches or voids.

27. The method of claim 25, wherein at least some of the trenches or voids are part of an electronic band gap device.

28. An apparatus comprising:

a container including a first dielectric portion and a second dielectric portion sealed together and enclosing a gas or a vapor within the container, in which at least one of the first or second dielectric portion includes voids or trenches, the container includes an electromagnetic (EM) reflective coating on an outer surface thereof, and the EM reflective coating includes an opening that allows an EM signal to propagate into or out of the container; and an antenna at the opening.

29. The apparatus of claim 28, wherein the EM reflective coating is in some of the trenches or voids.

30. The apparatus of claim 28, wherein at least some of the trenches or voids are part of an electronic band gap device.

* * * * *